INVENTORS.
HOWARD A. TOPP, Jr.
RALPH. S. MEGERLE
BY GLENN H. SHAW
L. Lee Humphries
ATTORNEY INVENTORS.
HOWARD A. TOPP, Jr.
RALPH S. MEGERLE
GLENN H. SHAW
BY
L. Lee Humphries
ATTORNEY INVENTORS.
HOWARD A. TOPP, Jr.
RALPH S. MEGERLE
GLENN H. SHAW
BY L. Lee Humphries
ATTORNEY INVENTORS.
HOWARD A. TOPP, Jr.
RALPH S. MEGERLE
GLENN H. SHAW
BY L. Lee Humphries
ATTORNEY INVENTORS.
HOWARD A. TOPP, Jr.
RALPH S. MEGERLE
BY GLENN H. SHAW L. Lee Humphries
ATTORNEY Nov. 23, 1965 H. A. TOPP, JR., ETAL 3,219,927

AUTOMATIC FUNCTIONAL TEST EQUIPMENT UTILIZING DIGITAL PROGRAMMED STORAGE MEANS

Filed Sept. 15, 1958

35 Sheets-Sheet 6

INVENTORS.
HOWARD A. TOPP, Jr.
RALPH S. MEGERLE
GLENN H. SHAW

BY L. Lee Humphries

ATTORNEY

INVENTORS.
HOWARD A. TOPP, Jr.
RALPH S. MEGERLE
GLENN H. SHAW

BY L. Lee Humphries
ATTORNEY

INVENTORS.
HOWARD A. TOPP, Jr.
RALPH S. MEGERLE
GLENN H. SHAW
BY
L. Lee Humphries
ATTORNEY Nov. 23, 1965 H. A. TOPP, JR., ETAL 3,219,927

AUTOMATIC FUNCTIONAL TEST EQUIPMENT UTILIZING DIGITAL PROGRAMMED STORAGE MEANS

Filed Sept. 15, 1958 35 Sheets-Sheet 9

INVENTORS.
HOWARD A. TODD, Jr.
RALPH S. MEGERLE
GLENN H. SHAW

BY *L. Lee Humphries*

ATTORNEY

Nov. 23, 1965 H. A. TOPP, JR., ETAL 3,219,927
AUTOMATIC FUNCTIONAL TEST EQUIPMENT UTILIZING DIGITAL PROGRAMMED STORAGE MEANS
Filed Sept. 15, 1958
35 Sheets-Sheet 10
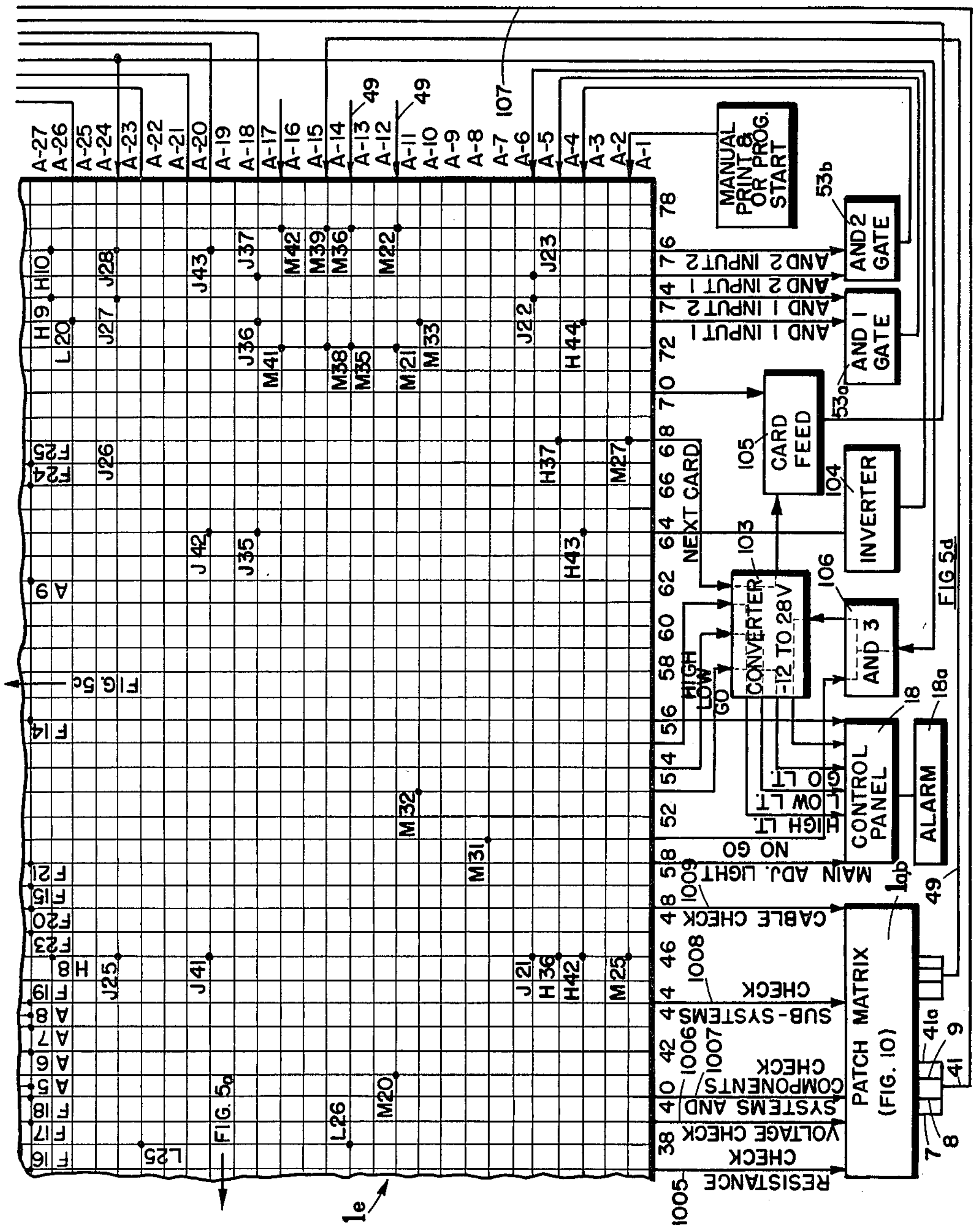
INVENTORS.
HOWARD A. TOPP Jr.
RALPH S. MEGERLE
GLENN H. SHAW
BY L. Lee Humphries
ATTORNEY INVENTORS.
HOWARD A. TOPP, Jr.
RALPH S. MEGERLE
GLENN H. SHAW
BY L. Lee Humphries
ATTORNEY INVENTORS.
HOWARD A. TOPP, Jr.
RALPH S. MEGERLE
GLENN H. SHAW
BY L. Lee Humphries
ATTORNEY INVENTORS.
HOWARD A. TOPP, Jr.
RALPH S. MEGERLE
GLENN H. SHAW
BY
L. Lee Humphries
ATTORNEY INVENTORS.
HOWARD A. TOPP, Jr.
RALPH S. MEGERLE
GLENN H. SHAW
BY L. Lee Humphries
ATTORNEY INVENTORS.
HOWARD A. TOPP J
RALPH S. MEGERLE
GLENN H. SHAW
BY L. Lee Humphries
ATTORNEY INVENTORS.
HOWARD A. TOPP, Jr.
RALPH S. MEGERLE
GLENN H. SHAW
BY L. Lee Humphries
ATTORNEY INVENTORS.
HOWARD A. TOPP, Jr.
RALPH S. MEGERLE
BY GLENN H. SHAW
L. Lee Humphries
ATTORNEY INVENTORS.
HOWARD A. TOPP, Jr.
RALPH S. MEGERLE
BY GLENN H. SHAW
L. Lee Humphries
ATTORNEY INVENTORS
HOWARD A. TOPP JR.
RALPH S. MEGERLE
GLENN H. SHAW
BY L. Lee Humphries
ATTORNEY

*INVENTORS*
HOWARD A. TOPP JR.
RALPH S. MEGERLE
GLENN H. SHAW
*BY* L. Lee Humphries
ATTORNEY

INVENTORS
HOWARD A. TOPP JR.
RALPH S. MEGERLE
GLENN H. SHAW

BY L. Lee Humphries
ATTORNEY

INVENTORS.
HOWARD A. TOPP, Jr.
RALPH S. MEGERLE
BY GLENN H. SHAW

L. Lee Humphries
ATTORNEY

Nov. 23, 1965 H. A. TOPP, JR., ETAL 3,219,927

AUTOMATIC FUNCTIONAL TEST EQUIPMENT UTILIZING DIGITAL PROGRAMMED STORAGE MEANS

Filed Sept. 15, 1958 35 Sheets-Sheet 23

INVENTORS
HOWARD A. TOPP JR.
RALPH S. MEGERLE
GLENN H. SHAW

BY L. Lee Humphries

ATTORNEY

Nov. 23, 1965 H. A. TOPP, JR., ETAL 3,219,927

AUTOMATIC FUNCTIONAL TEST EQUIPMENT UTILIZING DIGITAL PROGRAMMED STORAGE MEANS

Filed Sept. 15, 1958 35 Sheets-Sheet 24

INVENTORS
HOWARD A. TOPP JR.
RALPH S. MEGERLE
GLENN H. SHAW

BY L. Lee Humphries

ATTORNEY

INVENTORS.
HOWARD A. TOPP JR.
RALPH S. MEGERLE
GLENN H. SHAW
BY
L. Lee Humphries
ATTORNEY Nov. 23, 1965 H. A. TOPP, JR., ETAL 3,219,927

AUTOMATIC FUNCTIONAL TEST EQUIPMENT UTILIZING DIGITAL PROGRAMMED STORAGE MEANS

Filed Sept. 15, 1958 35 Sheets-Sheet 26

INVENTORS.
HOWARD A. TOPP JR.
RALPH S. MEGERLE
GLENN H. SHAW

BY L. Lee Humphries

ATTORNEY

INVENTORS.
HOWARD A. TOPP JR.
RALPH S. MEGERLE
GLENN H. SHAW
BY
L. Lee Humphries
ATTORNEY INVENTORS
HOWARD A. TOPP JR.
RALPH S. MEGERLE
GLENN H. SHAW
BY
L. Lee Humphries
ATTORNEY INVENTORS
HOWARD A. TOPP JR.
RALPH S. MEGERLE
GLENN H. SHAW
BY L. Lee Humphries
ATTORNEY

INVENTORS.
HOWARD A. TOPP JR.
RALPH S. MEGERLE
GLENN H. SHAW

BY L. Lee Humphries
ATTORNEY

INVENTORS
HOWARD A. TOPP JR.
RALPH S. MEGERLE
GLENN H. SHAW
BY
L. Lee Humphries
ATTORNEY

*INVENTORS*
HOWARD A. TOPP JR.
RALPH S. MEGERLE
GLENN H. SHAW
*BY* L Lee Humphries
ATTORNEY INVENTORS.
HOWARD A. TOPP Jr.
RALPH S. MEGERLE
GLENN H. SHAW
BY
L. Lee Humphries
ATTORNEY INVENTORS
HOWARD A. TOPP JR.
RALPH S. MEGERLE
GLENN H. SHAW
BY
L. Lee Humphries
ATTORNEY

*INVENTORS.*
HOWARD A. TOPP, Jr.
RALPH S. MEGERLE
*BY* GLENN H. SHAW
L. Lee Humphries
ATTORNEY 3,219,927

AUTOMATIC FUNCTIONAL TEST EQUIPMENT UTILIZING DIGITAL PROGRAMMED STORAGE MEANS

Howard A. Topp, Jr., and Ralph S. Megerle, Fullerton, and Glenn H. Shaw, East Whittier, Calif., assignors to North American Aviation, Inc.

Filed Sept. 15, 1958, Ser. No. 761,107
18 Claims. (Cl. 324—73)

This invention relates to a system for automatically checking the performance of a given system or a device and more particularly relates to an automatic system for determining the functioning at various test points throughout a complicated system.

The device of the invention provides generation of desired inputs to a system to be tested, measurement of the response of the system, and comparison of the response with a reference response with which the system must conform. It may additionally merely inspect the conditions within a system without providing generated inputs.

There is considerable concern over the magnitude of the problem of testing complex systems, such as, for example, a fire control system, autopilot system, power plant and power supply systems. This problem is increased in magnitude when several, or even all, of these systems must be tested simultaneously in order to determine readiness for operation. The testing, of course, must be comprehensive and accurate. The job is time-consuming, difficult, and exacting, requiring personnel with an unusual amount of technical training so as to be familiar with each or all of the systems undergoing tests. Many subcombinations of a system are interdependent and therefore checking such a system further implies close regulation of the performance of each of the subsystems. Such complexity further requires something akin to intuition in order to determine wherein lies any malfunction. Ordinarily, a test setup is comprised of laboratory type instruments connected in custom-made fashion for testing a narrow portion of the system and includes no flexibility or adaptability either for other portions of the same system or for other systems.

It is desired, therefore, that an automatic functional test device, or automatic checkout device, as it may be sometimes herein called, be provided that will rapidly and dependably check out a system and isolate the source of trouble without requiring the services of skilled personnel. The equipment must be reliable, accurate and comprehensive, must require a minimum in manual adjustment and operation, and provide a maximum of information concerning the proper performance of the various portions of the system or device being checked.

One feature around which the device of the invention is devised is a "go, no-go" test routine which may be carried out by clerical personnel. Participation by technical personnel is limited to simple tasks of connecting the device of the invention to the equipment under test and initiating automatic test procedures.

Automatic checkout, of course, implies detecting the various conditions and responses within the object under test and interpretation of the test results. Since this is accomplished automatically, a high degree of consistency and dependability is achieved. The intelligence required to perform the predetermined test, or sequence of the predetermined tests, and reference values for the tests is retained in a memory device, for example, punched cards, punched tape, or storage devices of a magnetic character. The automatic functional checkout equipment interprets the stored information and automatically implements the tests and determines the results of the tests. Punched cards or punched or magnetic tape may thus be used in sequence to systematically undertake functional checkout of the most complicated of systems, including electrical, electronic, hydraulic, pneumatic, magnetic and electromechanical systems.

The automatic functional test device by reason of the flexibility, the ease with which punched cards may be prepared and handled, the ease of storing information, becomes a universal tester.

Assuming that the device of the invention has been transported to a particular system to be placed under test and that connections have been made to the many test points of the system under test, automatic checkout then is commenced by feeding, for example, punched cards into a programmer which reads and interprets the card information and automatically implements the test. There is included one or more signal sources which the card programmer may connect to various of the test points of the system under test (in accordance with the punched card instructions). The programmer also selects outputs of the system under test in order to determine whether or not proper system or component performance is being obtained. The punched card also informs the card programmer which of these output test points is to be investigated. A comparator receives (generally through one or more intermediate connectors) the output of the test point being investigated and further receives reference information from the card in the programmer for comparison. Output indicators, such as a "go, no-go" light indicator or a data printer may then be used to indicate whether the particular response of the object under test is satisfactory or unsatisfactory when compared with the information on the punched card. If the test continues, the next card may direct only a change in which a new test point is to be investigated (the input generated signal to the device under test remaining the same). The comparator then receives the information from the new check point and compares it with the programmed information on the punched card and, again, indicates whether or not it is acceptable or should be rejected. Continuing with the test, then, the programmer may, this time, program a new input signal to the same or different portions of the system under test. The new cards, of course, calling for new input signals, will provide to the comparator, reference values to be compared with the output of the system under test.

Fundamentally, then it may be understood that the automatic functional test equipment is a programmer which selects inputs to be applied to a system under test, and selects check points to be investigated. In addition, it desirably includes a comparator which compares the outputs at check points with reference values provided by the programmer and an indicator for indicating results of such comparison.

This invention will find wide application in the field, on the production line, in purchasing and inspection, trouble shooting, failure prediction, and quality control. By merely providing specially punched cards or other type of stored information, the device will automatically check its own circuitry and determine whether or not it is properly constructed and calibrated and isolate any malfunction that may exist in a component or portion of the device.

It is therefore an object of this invention to provide an automatic checkout device.

It is a further object of this invention to provide a universal, highly flexible automatic checkout device.

It is a still further object of this invention to provide an automatic functional test device capable of indicating proper system performance.

A still further object of this invention is to provide a flexible automatic functional test device which provides predetermined inputs to a system under test and determines the response of said system.

Another object of this invention is to provide an automatic functional test device which is capable of programming as a function of time the inputs or outputs of an object under test.

A further object of this invention is to determine the time intervals between test events.

A still further object of this invention is to provide a control for external switching circuits.

Still another object of this invention is to provide an automatic functional test device which provides predetermined electrical quantities to a device or system under test, and which selects the check points to be investigated and compares the outputs of those check points with a reference.

Another object of this invention is to provide a flexible automatic checkout device capable of providing control of auxiliary or accessory type devices.

A final object of this invention is to provide a rapid and accurate automatic checkout device capable of indicating whether or not the performance of an object being tested falls within or without specified limits.

Other objects of invention will become apparent from the following description taken in connection with the accompanying drawings, in which.

FIGS. *4a*, *4b*, and *4c* show the punched card, and illustrate the areas to be identified for punching of specific information.

Figure 3:
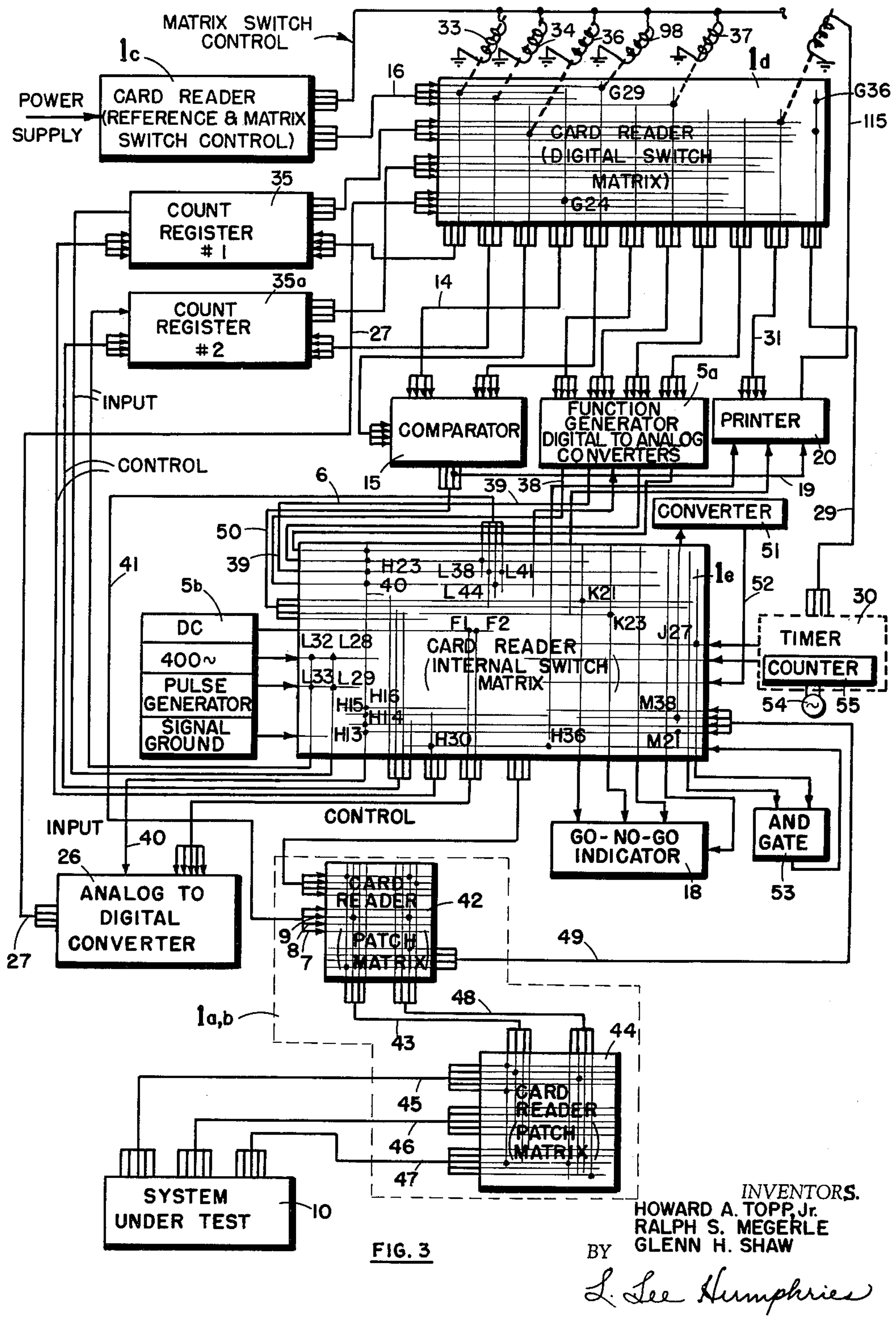
FIG. 3 is a general block diagram illustrating some of the features of the automatic checkout device.
Figure 7:
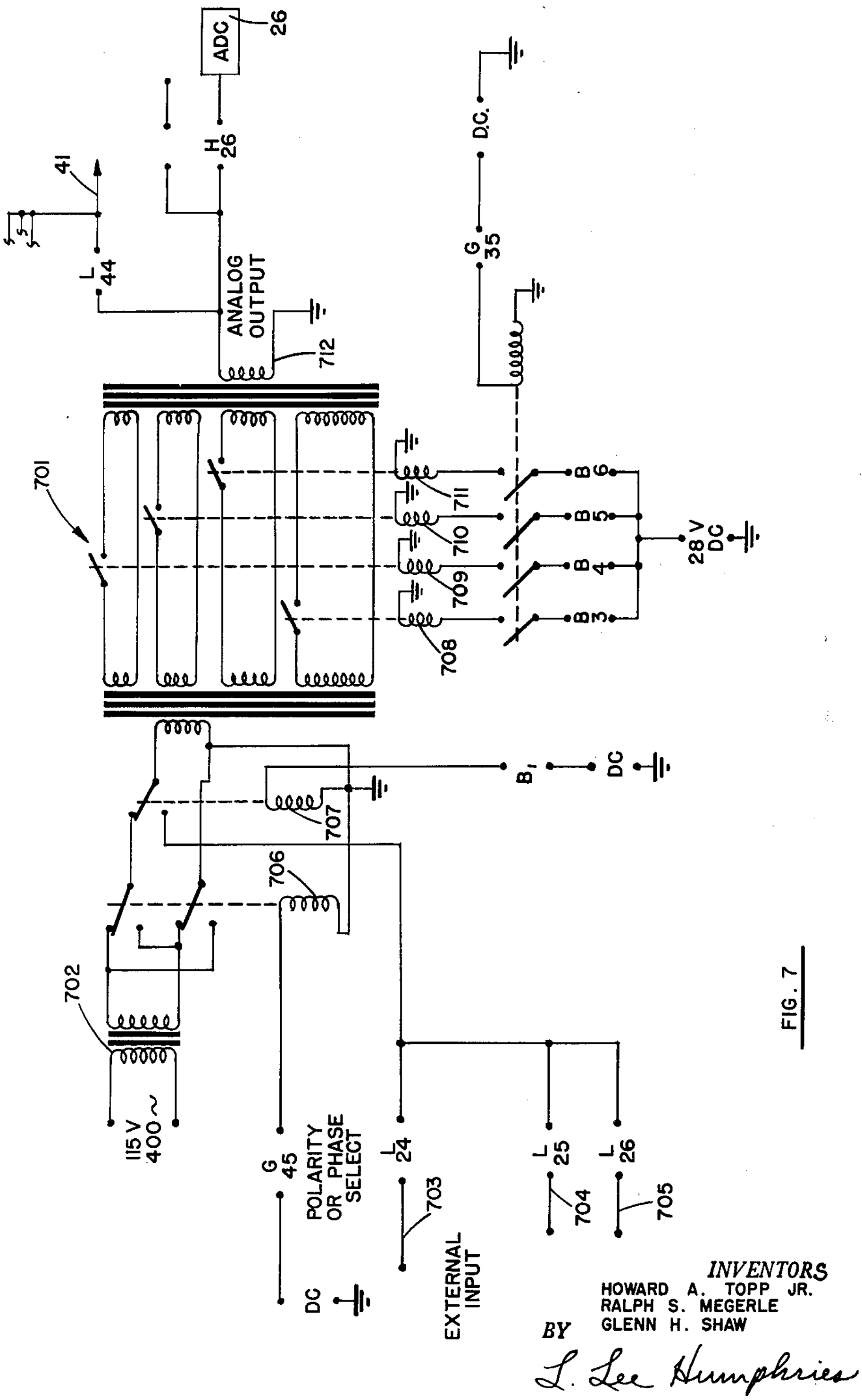
Figure 9A:
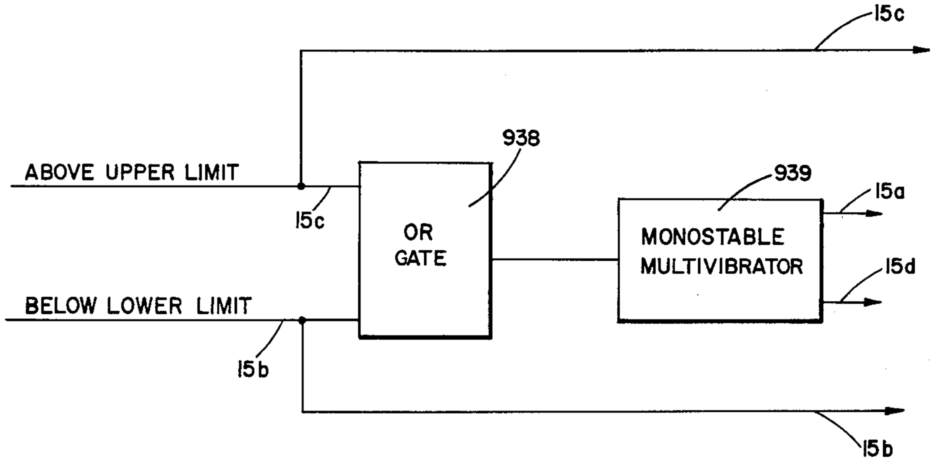
Figure 8:
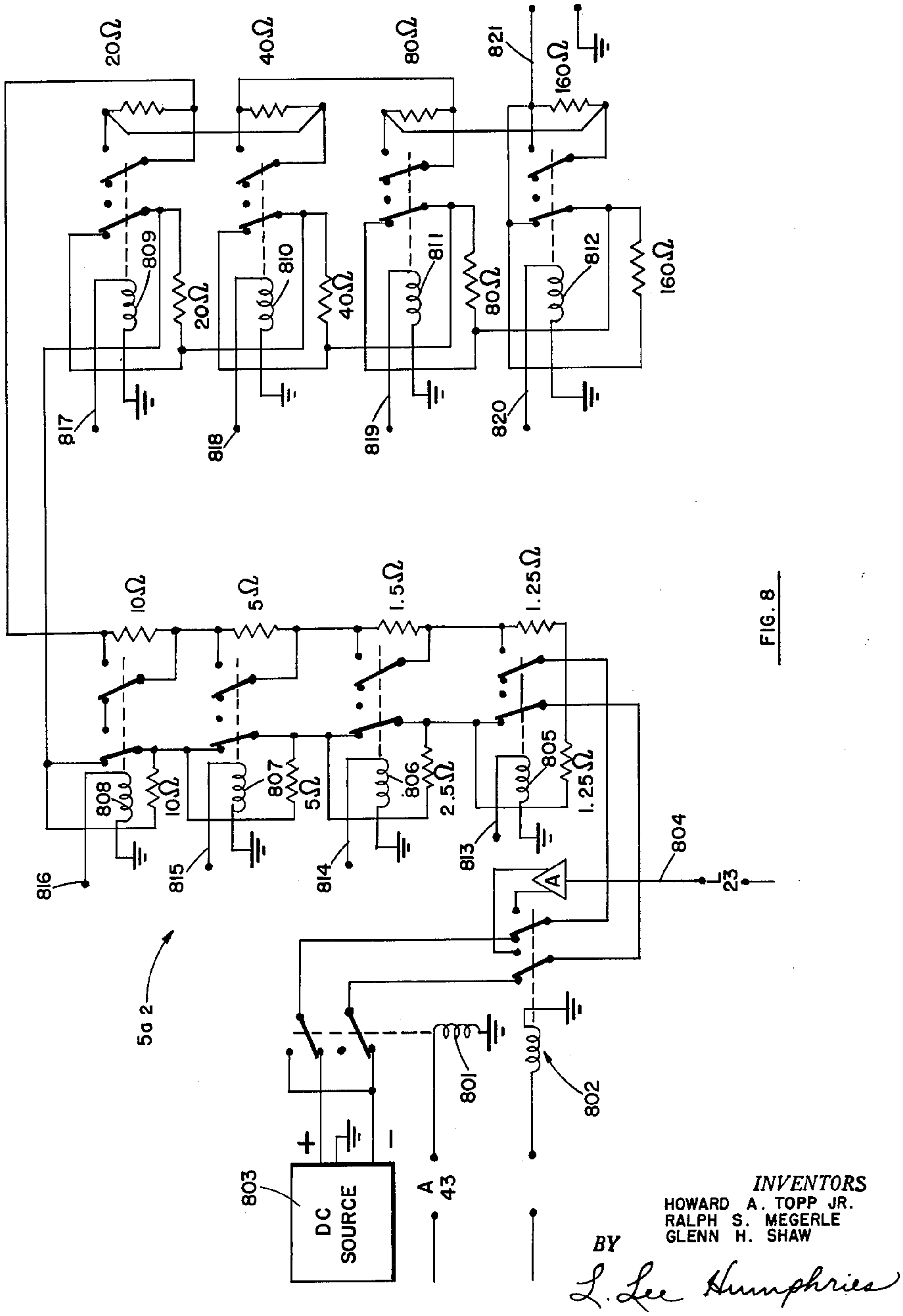
Figure 9:
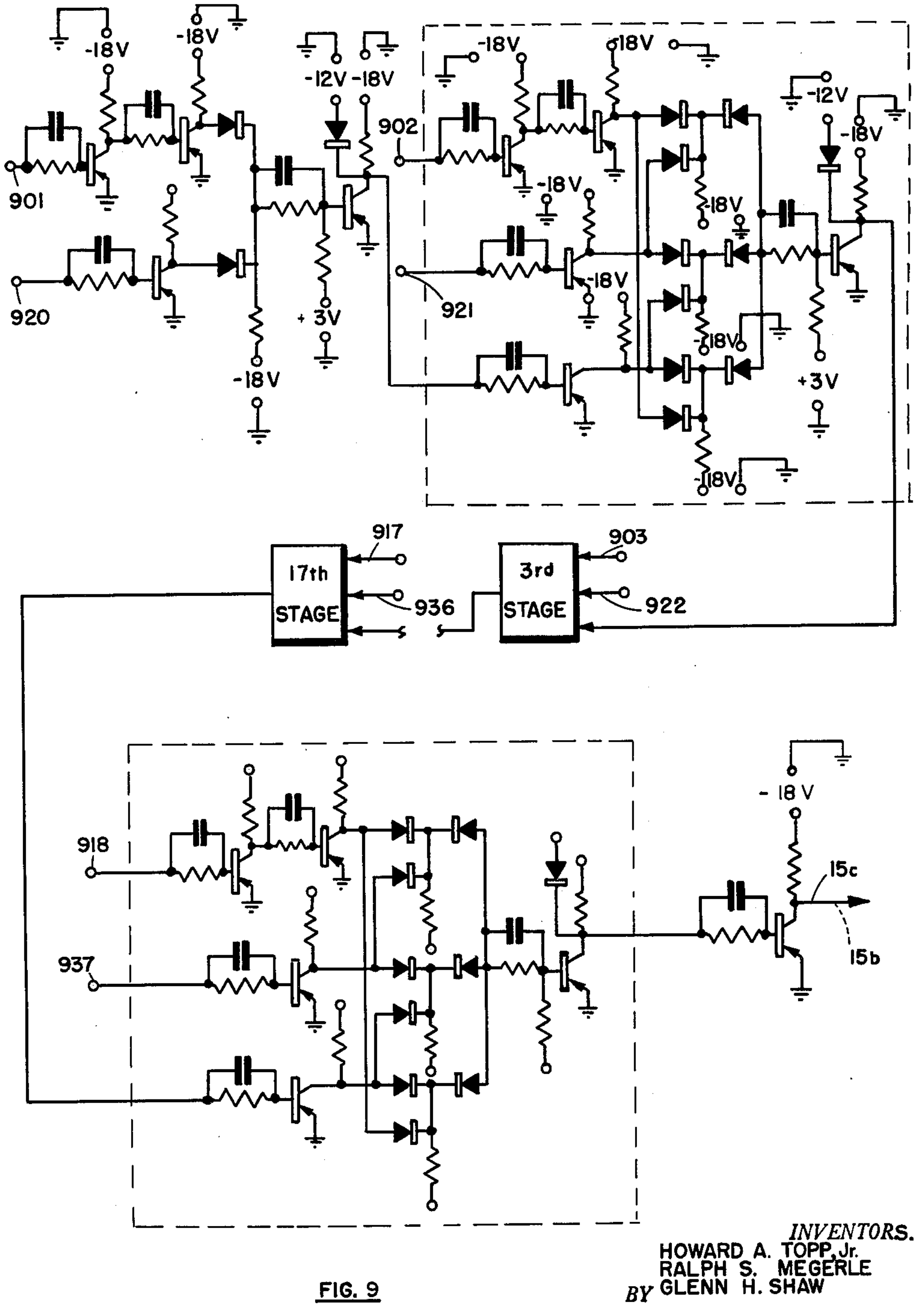

FIGS. *5a*, *5b*, *5c*, and *5d* are various quadrant portions of FIG. 3 and should be read together as a single drawing. These figures illustrate the connections of FIG. 3 in greater detail;

FIGS. *6a* through *6h* illustrate the analogue to digital converter and its input showing how the various inputs, power sources, and controls are applied to the converter;

FIG. 7 is an A.-C. digital to analogue converter;

FIG. *7a* is an illustration of an analogue to digital converter using a digital to analogue converter and a register;

FIG. 8 is a D.-C. digital to analogue converter;

FIG. 9 is a comparator for comparing input binary signals;

FIG. *9a* is an illustration of logic circuitry providing the output of the comparator.

Figure 10:
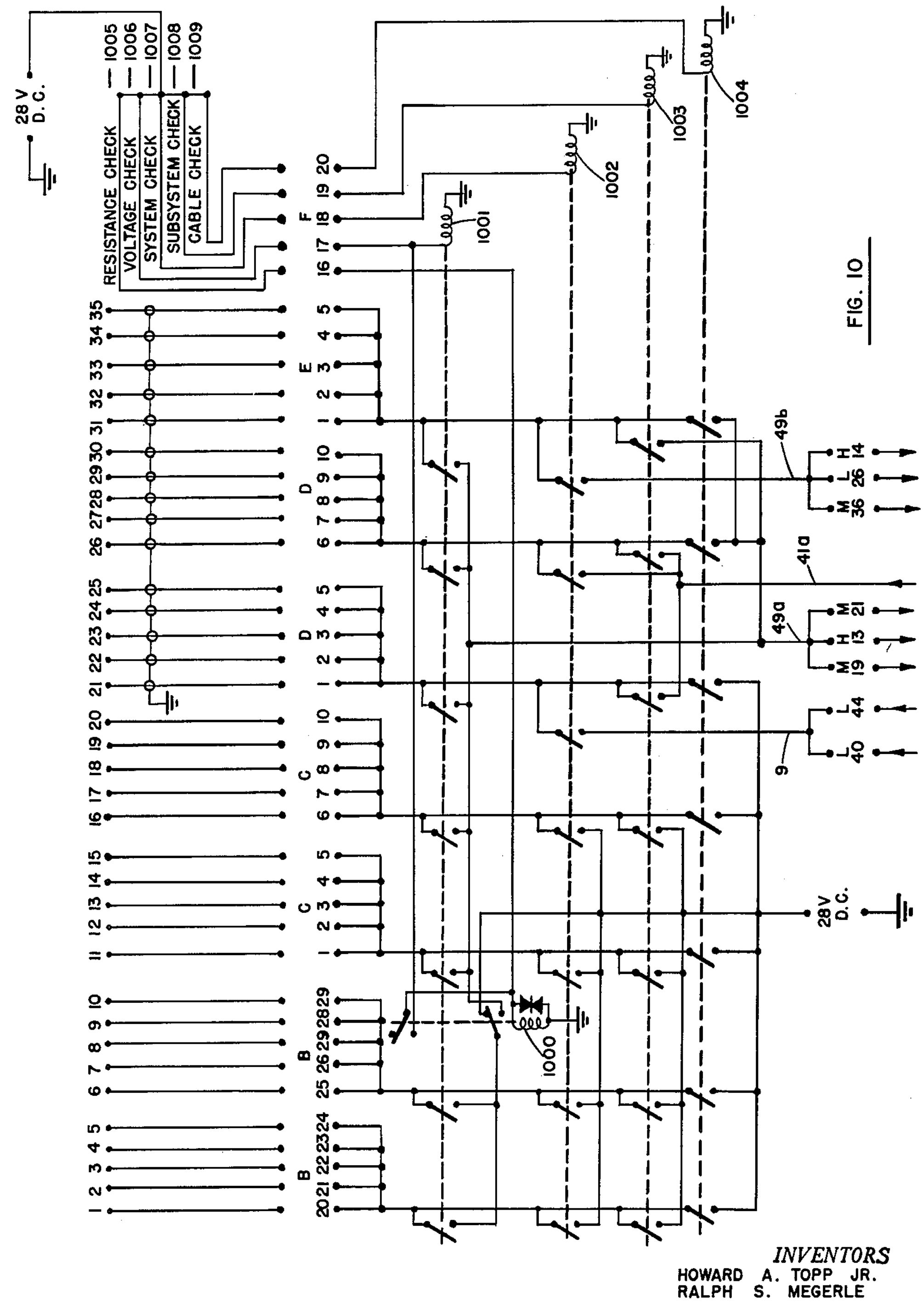
Figure 12:
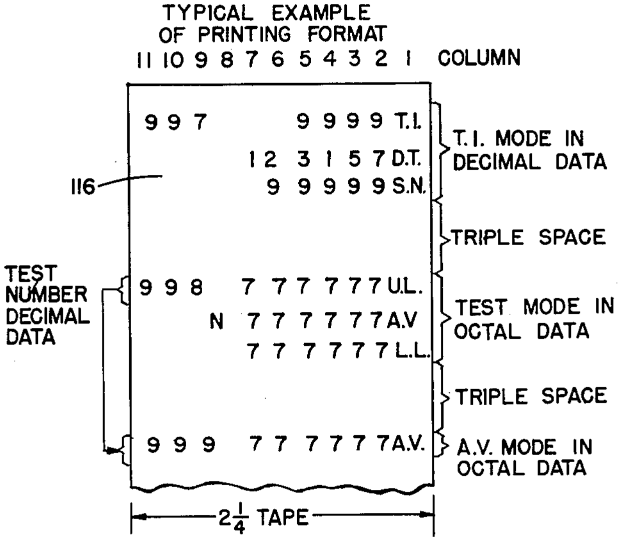
Figure 13:
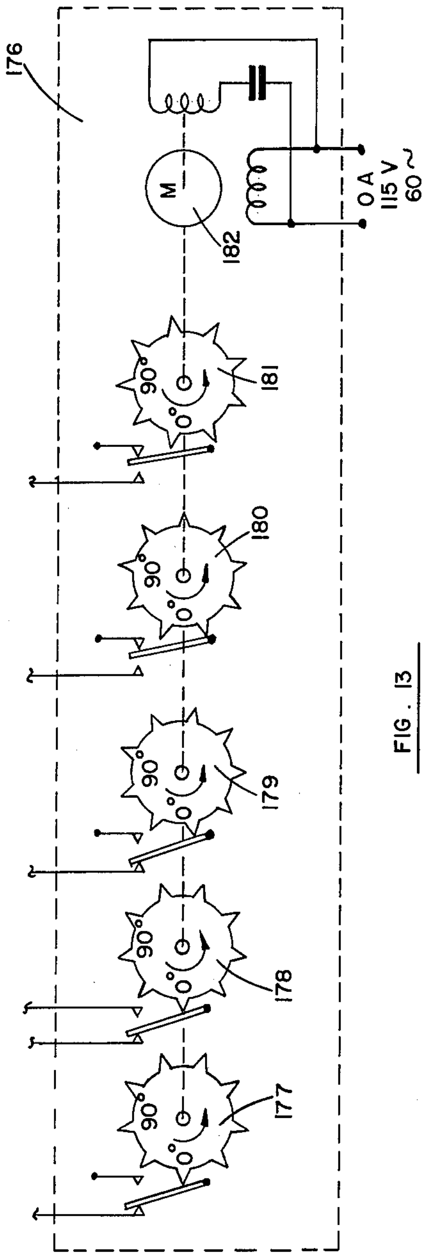
Figure 14:
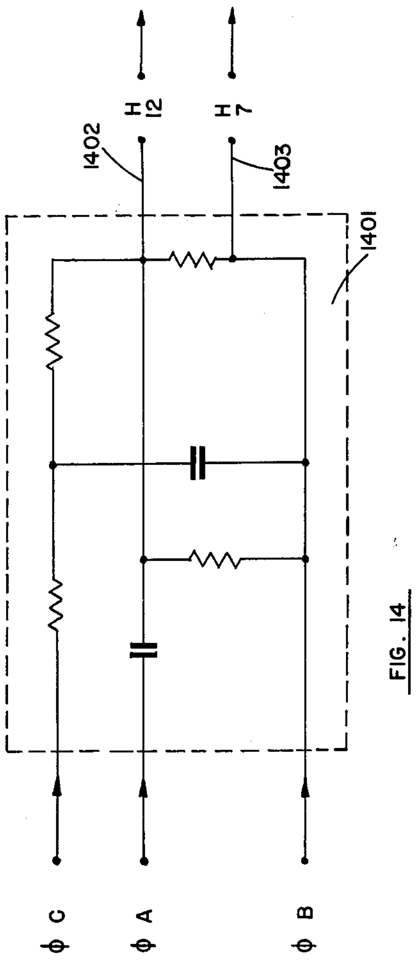
Figure 15:
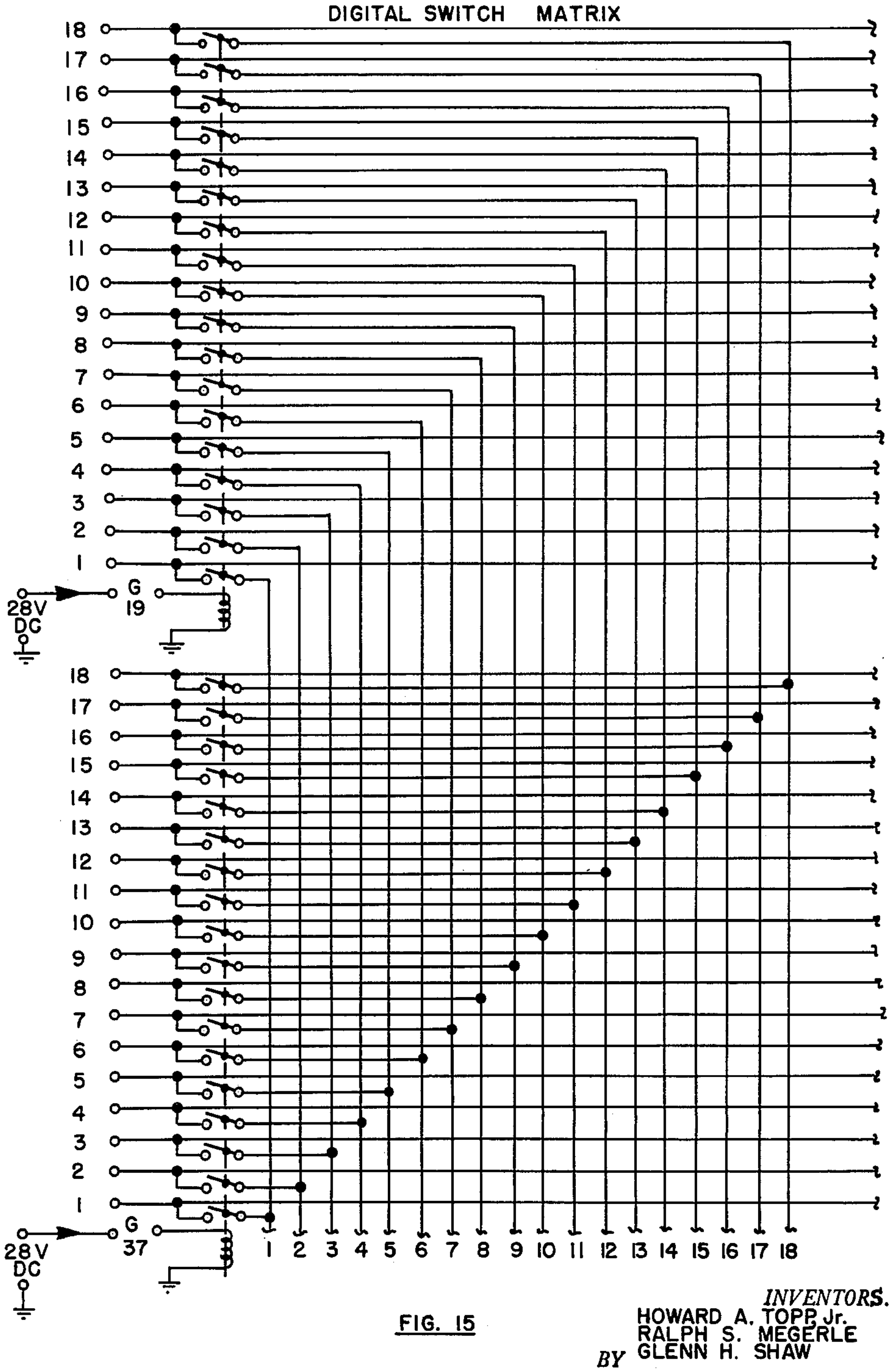
Figure 16:
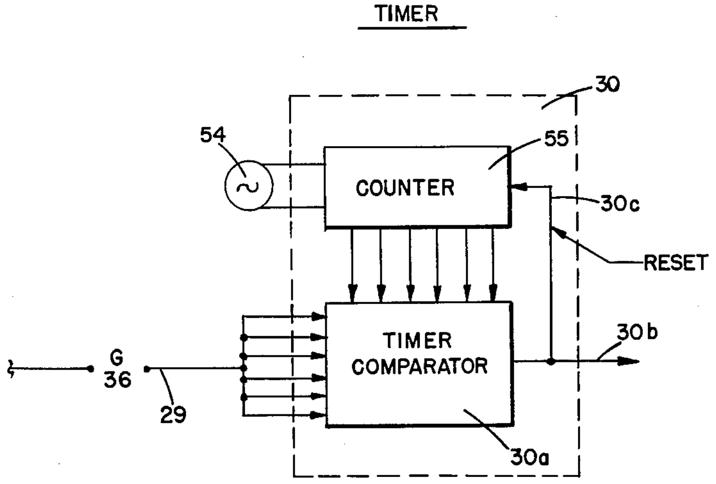
Figure 17:
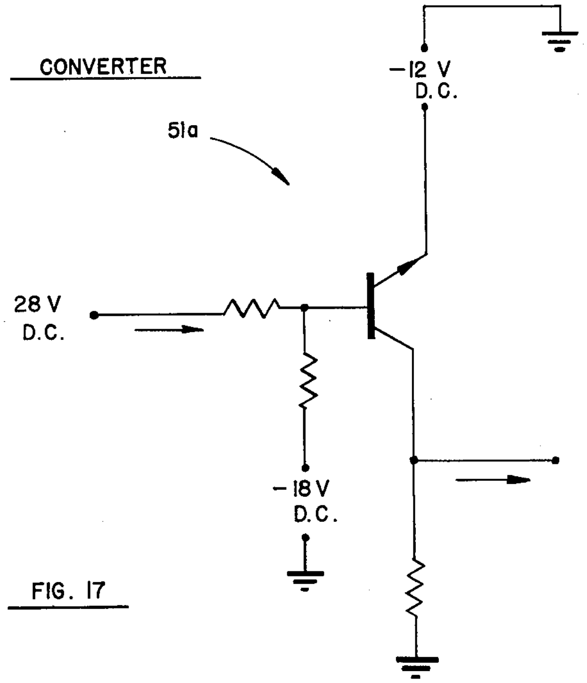
Figure 18:
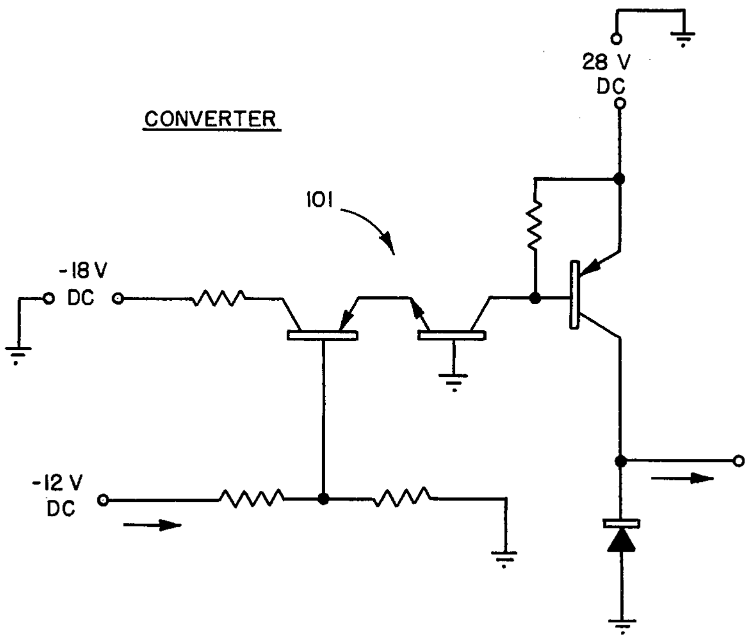
Figure 19:
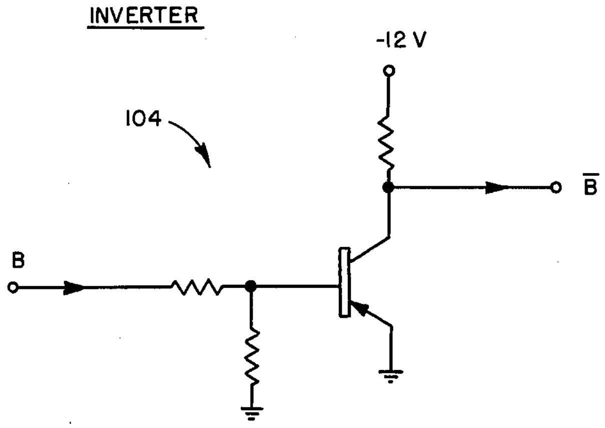

FIG. 10 is a schematic of the patch matrix;

FIGS. *11a* through *h* illustrate the printer and its various inputs and outputs;

FIG. 12 is an illustration of the tape upon which the printer operates, showing the various location of data;

FIG. 13 illustrates the cam operation which controls the successive operations of the printer;

FIG. 14 illustrates a phase rotation box which will indicate correct phase rotation;

FIG. 15 shows one portion of the digital switch matrix in which a single card hole operates a relay which connects eighteen input wires with eighteen output wires;

FIG. 16 is a block diagram of a timer;

FIG. 17 is a schematic diagram of a 28 volt D.-C. to −12 volt D.-C. converter;

FIG. 18 is a schematic diagram of a −12 volt D.-C. to 28 volts D.-C. converter; and FIG. 19 is a schematic diagam of an inverter.

Figure 1:
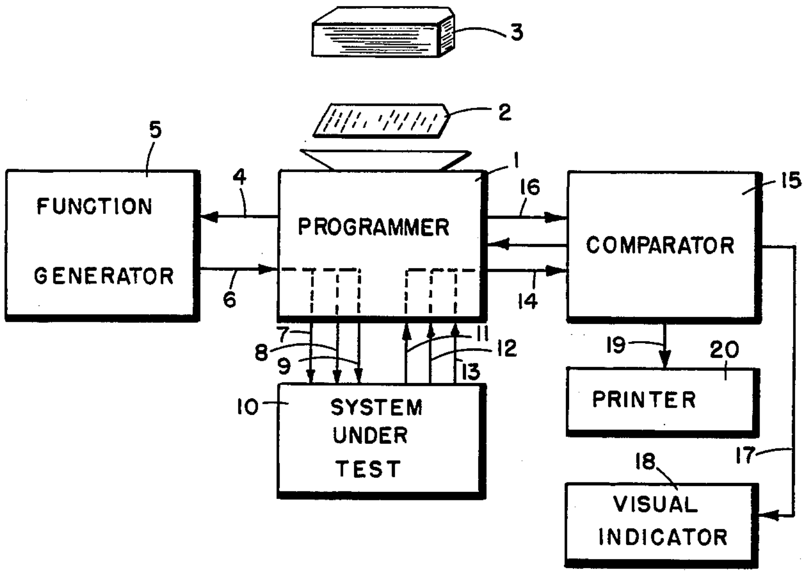
FIG. 1 is a simplified flow diagram showing the device of the invention.

Referring now to FIG. 1, a programmer receives punched cards such as card 2 from a stack 3 and from this card indicates on line 4 that function generator 5 is to provide information on line 6. Programmer 1 also selects which input 7, 8 or 9 will receive the signal from line 6 to be applied to system 10 under test. Programmer 1 further selects which of the check points in system 10 will be investigated by selecting which line 11, 12 or 13 will be connected to line 14 to be transmitted to comparator 15. On line 16, the programmer provides the comparator with a reference, for example, an acceptable upper limit and an acceptable lower limit, which comparator 15 will use to indicate on line 17 to visual indicator 18 "go," or "no-go." On line 19, comparator 15 may provide an indication to printer 20 of its comparison. It may cause the printer to print the reference value, for example, the acceptable upper limit and the acceptable lower limit, and the measured value. It may further provide some signals to the printer to indicate satisfactory or unsatisfactory performance detected by the comparator 15.

Figure 2:
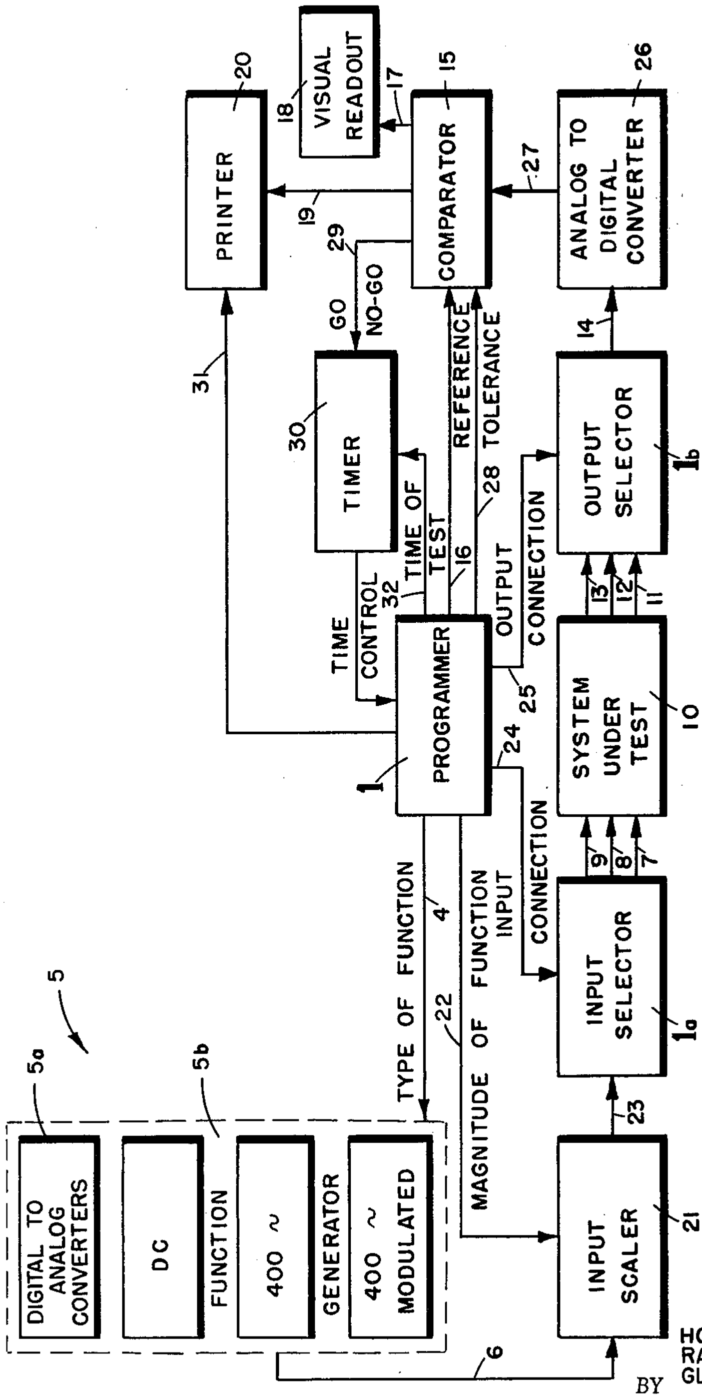
FIG. 2 is a second flow diagram illustrating in more detail and slight modification of FIG. 1, the control of flow of information within the device of the invention.

FIG. 2 illustrates in greater detail and slight modification some of the features of the invention. In order to obtain considerable flexibility, there is shown several types of sources of power or electrical signal sources in function generator 5 such as a digital to analogue converter, a D.-C. voltage source, a 400 cycle A.-C. source, a 400 cycle A.-C. source modulated with a low frequency and any other desired electrical function. The particular generator then transmits on line 6 to input scaling device 21 the signal to be applied to the system under test. The signal, however, may be required to be, for example, millivolts, microvolts, or volts. Scaling device 21 receives signals on line 22 from programmer 1 indicating which scale is to be selected. On line 23 the signal is transmitted to input selector 1*a* which may form a part of programmer 1, but which, in any event, receives information on line 24 indicating which input lead of leads 7, 8 and 9, is to receive the signal. Similarly, output selector 1*b* may form a part of programmer 1 and receive signals on line 25 indicating which output lead, 11, 12 or 13 is to be investigated. Whichever lead is selected, the signal is transmitted through line 14 to be converted into a digital signal by analogue to digital converter 26 which further transmits the digital signal on line 27 to comparator 15 to be compared with the reference signal (also in digital form), received on line 16 from programmer 1. Line 28 may indicate to comparator 15 information in digital form as to the tolerance allowed. Lines 16 and 28 may provide comparator 15 with tolerance or reference values by providing, for example, the upper limits and lower limits of acceptable value. It may be appreciated that an exact value could also be provided. Or, a selected malfunction value could be provided for comparison.

Upon comparison of the actual signal with the acceptable value, the visual readout 18 and printer 20 receive an indication of the results. In order to provide a continuing sequence of tests, comparator 15 may also provide on line 29 to a timer 30 a signal indicating "go, or no-go," indicating acceptability or nonacceptability. The timer 30 which then controls the continuing or sequencing operation of the automatic checkout device indicates to the programmer such information. If the timer 30 indicates that the next test is to be initiated, programmer 1 reads the next card and the test continues. Information may be supplied directly to printer 20 from programmer 1 on line 31. Programmer 1 may also furnish to timer 30 the time required for particular tests on line 32. For example, if the particular test requires several seconds to assume a steady state, programmer 1 can so indicate on line 32 to timer 30 which will then hold up initiation of the next test until the required interval has elapsed.

The programmer 1 is illustrated as comprised of several different card readers 1*a*, 1*b*, 1*c*, 1*d*, and 1*e*, illustrated in FIG. 3 as located in several different locations. However, a single card as illustrated in FIGS. *4a*, *4b* and *4c* provides the switching connections which are to be made by the card readers shown in FIG. 3. It is to be understood, therefore, that a single card reading head adapted to read the complete card of FIGS. *4a*, *4b* and *4c* may be used to accomplish the illustrated function of readers 1*a*, 1*b*, 1*c*, 1*d* and 1*e* of FIG. 3.

Referring now to a primary feature of the device of the invention, that is, that it can provide a reference to be compared to a particular system under test, it may be seen that the card reader at 1c which reads a portion of a test card provides such reference information on several lines shown cabled together as line 16 to digital switch matrix portion of the card reader 1d. The portion of a card in reader 1c, of course, contains information in the form of punched holes and therefore the reference value may possibly require some chosen number, say 18, separate wires to transfer the information from card reader 1c to card reader 1d which reads another portion of the test card. Card reader 1c likewise determines, through control of relays 33 and 34, where the reference information is to be channeled. For example, the reference information may be sent to the count register 35 through control of card reader 1d by card reader 1c, by means of relay 33; the information from count register 35 may also be transmitted to comparator 15 by means of relay 36. Relay 37 also controlled by card reader 1c allows for transferring information into the function generator 5a. In this manner, it is possible to store the reference value in count register 35, compare it in comparator 15 or generate an analog voltage comparable to it by means of function generators 5a, depending on the digital swtich matrix control information also stored on the punched card (and here represented as read out by card reader 1d).

Figure 4A:
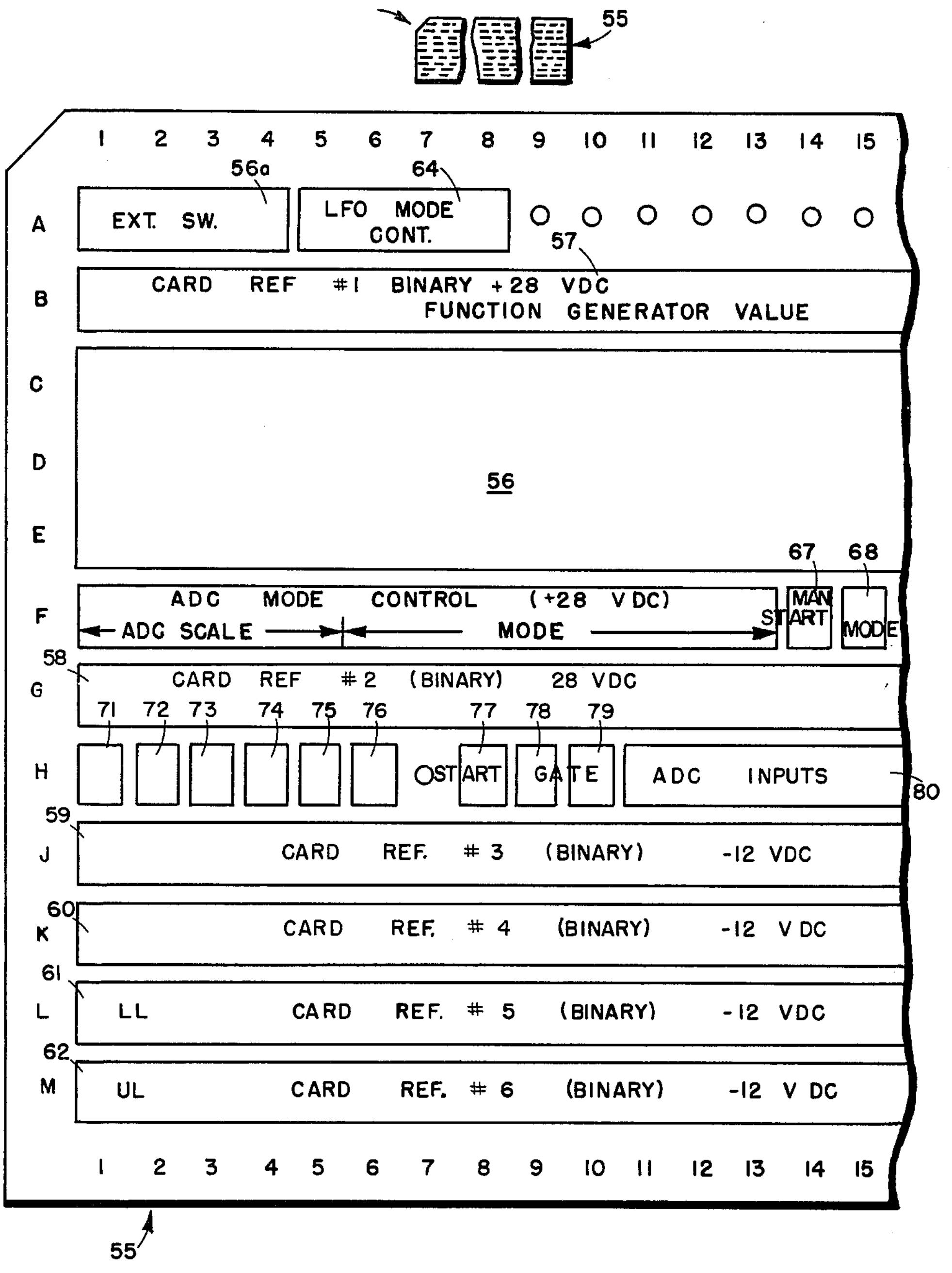
Figure 4B:
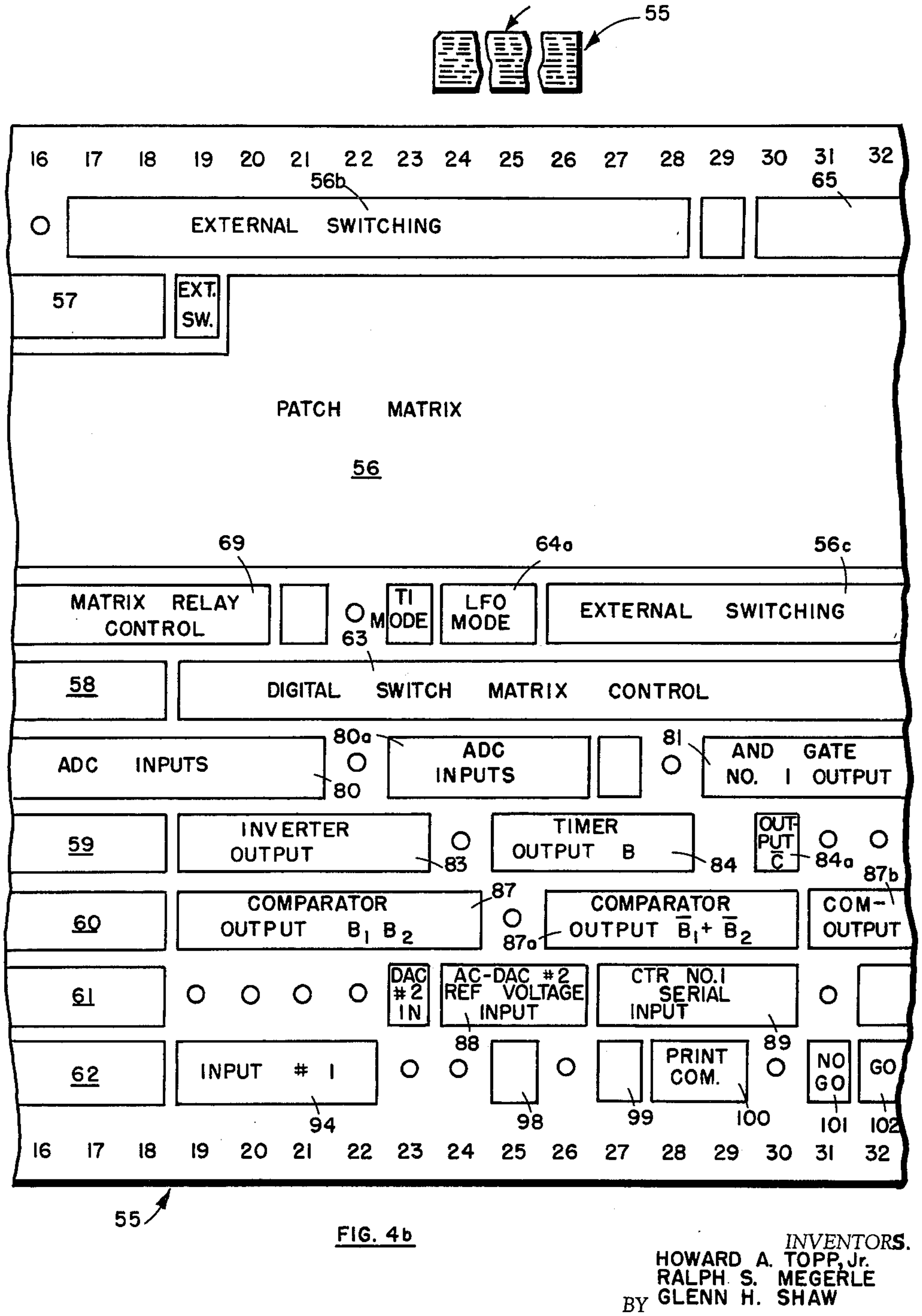
Figure 4C:
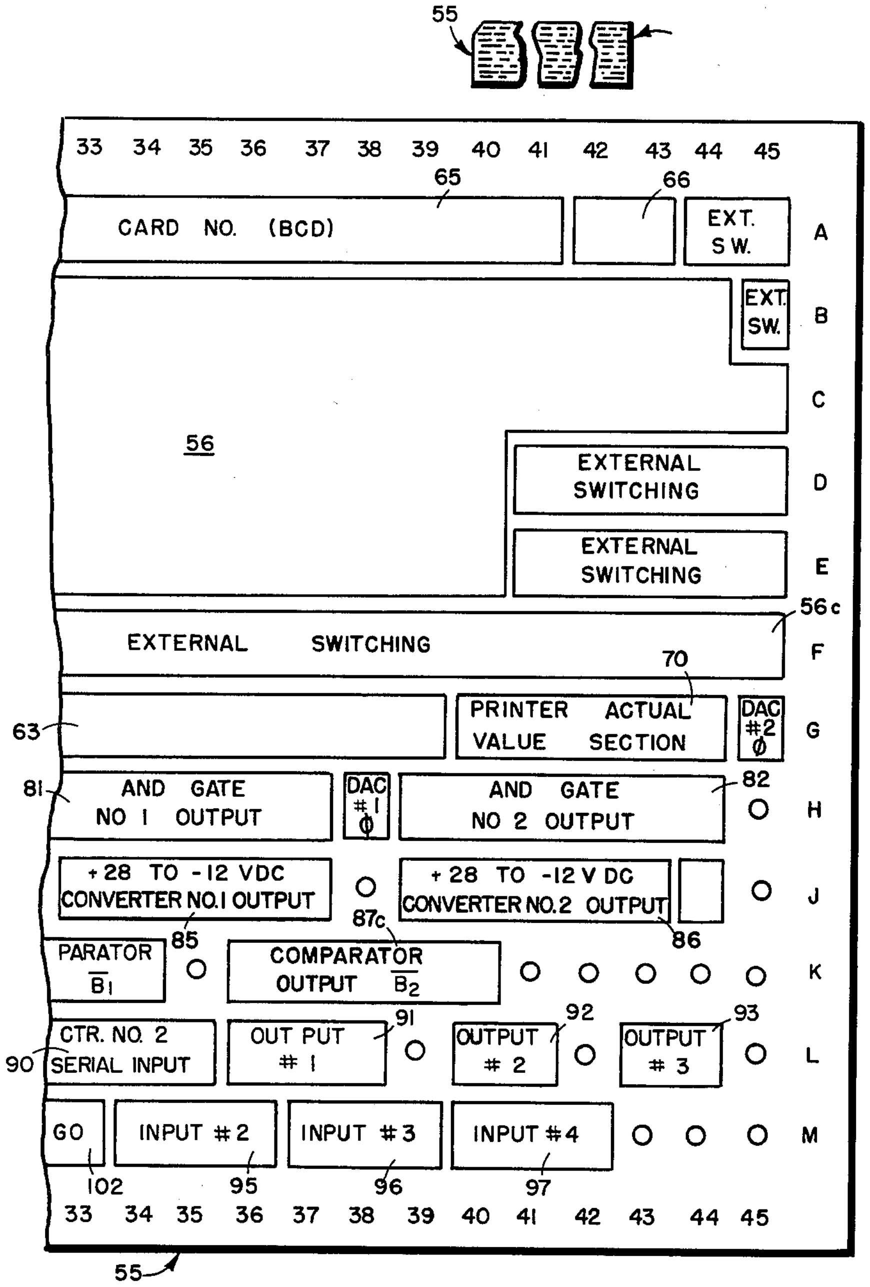

In accomplishing the purpose of providing a reference value, the information will ordinarily flow from card reader 1c to function generator 5a where it is transformed from a digital binary number to an analog voltage and then is transmitted as an output of function generators 5a to card reader 1e on lines such as 38 and 39. In card reader 1e which reads still another portion of the card, if a hole is punched at, for example, the location indicated H23, the information on line 39 will be transmitted on line 40 as an input to analog to digital converter 26, whereupon the information may be changed back to digital information and rerouted again through digital switch matrix 1d. If holes are punched in the card at locations L38, L41 and L44, the information, which is of course an analog voltage, may be transmitted along a wire of cabled line 41 which contains lines such as 7, 8 and 9, for subsequent patching into system 10 which is under test. Depending on which hole is punched in patch matrix 42, information is received out of the matrix on one of several lines which are cabled together in line 43 and sent to patch matrix 44 to be sent to particular test areas of system 10 under test, as, for example, along one of the lines cabled together in cable 45 or 46. The test information may be extracted from the system under test along one of the lines cabled together in cable 47 (or even one of the lines originally cabled in 45 or 46), transferred back to the patch matrix 44 where, according to holes punched in the card, it may be transmitted back to patch matrix 42 along one of the lines cabled together in cable 48. The output continues from card reader 42 along one of the lines cabled together in cable 49 and is transmitted back to the card reader 1e for internal switching where, if holes are punched at any one of locations H13, H14, H15, or H16 (line H, columns 13, 14, 15 or 16 of the punched card, see FIGS. 4*a*, 4*b*, 4*c*), information is transmitted from a particular test point back to the input to the analog to digital converter 26. Thus far we have indicated how a reference value may be stored on a card read at reader 1c, routed through a function generator (digital to analog converter) routed to a patch matrix for application to a system 10 under test. The test value, or "actual value" as it is herein referred to, is routed from a test point from the system under test back through a patch matrix 42 and then to the card reader (internal switching device 1e) and back to analog to digital converter 26. Thus, at this time the "actual value" information received from the system under test is converted to digital form and suitable to be compared with a reference contained in the card reader 1c. It may be readily appreciated that the reference value obtained at this time from reader 1c may be the original value sent to the system under test or may be another predetermined value which is expected to occur as a result of the reference value sent to the system under test. Such reference value may also be a limit value, an acceptable or non-acceptable value, or a required value. The output of the analog to digital converter (actual value which is received from the system under test) travels, with or without any allowable tolerance, in digital form along several parallel lines cabled together in cabled line 27 and is transferred back to card reader 1d which, if punched to allow it, as at hole G24, sends the actual value to comparator 15 along the lines cabled together in cable 14. The other value (reference value) with which it is to be compared is received from card reader 1d along the lines cabled together in line 16 and such reference value may originate, for example, in card reader 1c if, for example, a hole is punched at G29 and the controlling relay 98 is energized. The reference value may also be obtained from one of the count registers 35 or 35a. The output of the comparator, of course, may be sent directly on a particular line 19 to printer 20 or may be transferred on one of the lines cabled together in cable 50 whereupon if holes are punched at locations such as K21 or K33, information will be sent to the "go, no-go" indicator 18 which will indicate the results determined by comparator 15.

It may be noted that various other features are present. For example, if the output voltage of the system under test is expected to be scaled too high, which voltage is transmitted on line 49 to card reader 1e, a hole punched at locations $F_1$ or $F_2$ can be used to change the scale of the anlog to digital converter. Another feature, for example, is achieved by punching holes such as L28, L29 or L32 or L33. Information may be fed directly into the count registers 35 and 35a according to card punch information.

It may be easily understood in view of what has so far been described that the automatic check-out device of the invention is highly flexible. For example, the card readers 42 and 44 (1a, 1b) which read separate portions of the test card provide a patch matrix which is capable of selecting any test point of the system on which to place a signal or a voltage or, also, to evaluate that test point and determine the voltage thereon. For example, in a preliminary set-up, it may be that the automatic checkout device merely looks at all the test points of the system 10 without any electrical excitation in order to determine whether or not any voltages exist. As a subsequent procedure, a small voltage may be programmed into particular portions of the system 10 and particular test points may be scanned for their output in order to determine the resistance of various elements of the system 10.

In the test procedure, card reader 1c may provide its reference value to comparator 15 information as upper limits and the lower limits of an acceptable test value. At the same time it may provide to function generator 5 a signal which properly sets system 10 to operating and there is received then in the analog to digital converter 26 the "actual values" (occurring in system 10) which are then compared with the "desired values" (upper and lower limits) sent to comparator 15. Printer 20 at this time may be programmed print the upper limit, subsequently the actual value, and subsequent to that the lower limit indicating at the same time according to comparator 15 whether or not the actual value falls within the upper and the lower limits. The printer may also be designed to print the test serial number as programmed in the card reader, serial number, date, etc.

"And" gate 53 provides a means of controlling the flow of information, for example, into the printer as would be provided by a hole punched in card reader 1e at position H36 or into counter 35 as provided by a hole punched at H30. The timer 30 may be used to control the timing of subsequent functions by reason of the hole punched at J27 and by reason of the function of "and" gate 53. That is, the "and" gate would not provide a signal until the timer had allowed a signal to pass opening "and" gate 53. Thus any component of the automatic checkout device may be connected to be disabled until a signal is received from the timer. Since the delay of the timer can be programmed, (as by a hole punched at G36 which operates a relay to send 18 bits of information to the timer as explained previously in describing card reader *1d*) a programmed time delay can be sent to commence substantially any operation of the checkout equipment. Timer 30 receives information on lines cabled together on line 29. Timer 30 is more in the nature of a comparator; that is, an output signal is provided only when source 54 provides counter 55 of the timer with a count which matches the input count received on lines 29 which may have originated in the card reader *1c*. In this manner the timer can be scaled to a particular fraction of the output frequency of source 54. Thus various time delays are made possible.

*Card area allocations*

Understanding then that in FIG. 3 the various card readers *1a, b, c, d,* and *e,* are actually a single card reader and that the holes which determine whether or not connections are made between various input and output lines are located on a punched card such as is shown in FIGS. *4a, 4b,* and *4c,* the various card readers *1a, b, c, d,* and *e* may be considered to be particular areas of a punched card or the card reader which reads the punched card. For example, card readers *1a* and *b* of FIG. 3 may be considered to be area 56 of punched card 55, FIGS. *4a, 4b,* and *4c*. These readers may also read areas such as *56a, b, c,* etc. It would be recalled that these switching areas determine what inputs are applied to the system under test and what outputs are obtained from the system under test, this being obtained of course by a patch type matrix controlled by the holes punched in card 55.

Referring to FIG. 3, it may be seen on card reader *1e* that holes punched, for example, at L28 may be located on the punched card, FIG. *4b,* by looking in line L, column 28, where it may be seen that such area 89 controls the counter No. 1, serial input. Card reader *1e* may be thought of as a switch matrix for connecting up circuits of analog signals.

Card reader *1c* of FIG. 3 obtains its reference values from areas 57, 58, 59, 60, 61 and 62 of punched card 55. It may also obtain information from area 63 as to matrix switch control. Such matrix switch control, of course, controls relays such as 34, 35 and 36 of FIG. 3 in order to determine to what particular location the reference values of areas 57, 58, 59, 60, 61 and 62 are to be sent. For example, the reference information may be sent to the comparator, the function generator, the printer, or to the counter depending on how the digital switch matrix control area 63 is punched. Card reader *1d* is therefore somewhat passive in that as relay 33, for example, is excited an 18 pole single throw switch is closed to connect all 18 digits of the reference card reader *1c* into electrical circuits with the 18 lines in count register 35, for example. Relay 34, if thrown, would have closed the 18 pole single throw switch to connect all 18 electrical signals on line 16 into count register *35a*. It is noted that card reference areas 57, 58, etc., each have 18 locations for punched holes. Referring again to FIGS. *4a, 4b,* and *4c,* it may be seen that line A, area 64, may be used to control a low frequency oscillator which, for example, may have a frequency of one cycle per second or ten cycles per second, depending on which holes are punched. Also line A, area 65, may be used to identify the particular punched card by a serial card number according to which holes are punched. Area 66, line A, may provide a digital to analog converter control signal. In line F the first 5 holes may be used to set the scale on the analog to digital converter and the next 8 holes control the mode of the converter, A.C.-D.C., quadrature self test, resistance test, etc., Also, on line F, a manual start and disable signal for the printer may be supplied at area 67. The printer may be put into printing actual value mode by a punched hole at area 68. At area 69, the four channel patch matrix may be controlled. At area 70 further control of the printer may be obtained. On line H at areas 71, 72, 73, 74, 75 and 76, various reset and control signals may be obtained for the timer and the counters. Area 77 may provide a signal to start the printer and areas 78 and 79 may provide "and" gate controls. Areas 80 and *80a* may provide holes which will route signals to the analog to digital converter 26 of FIG. 3. The output of the "and" gate 53 may be controlled by areas 81 and 82. The inverter output may be controlled, on line J at area 83 for example. The timer output may be channeled according to the holes punched in area 84 and *84a* and the two converters may be controlled by the holes punched in areas 85 and 86. The comparator output may be channeled according to the holes punched on line K at area 87, *87a, b* and *c*. Input to the alternating current digital to function generator 5 may be controlled by the holes punched on line L at area 88 and inputs to counters 35 and *35a* in serial form may be controlled by holes punched in areas 89 and 90.

Considering the input lines such as 7, 8 and 9 cabled together in line 41 in FIG. 3, these lines may be channeled according to the holes punched in areas 91, 92 and 93 of line L, FIG. *4c*. Considering the lines cabled together in line 49 of FIG. 3, the output on these lines may be controlled by the holes punched in areas 94, 95, 96 and 97 on line M of FIGS. *4b* and *4c*. Area 98 may be used to start the printer, area 99 may be used to start the programmer itself, area 100 may be used to indicate the printing is complete. If the analog to digital converter is to be inspected for a "go" or "no-go" signal, the holes at areas 101 and 102 may be punched.

*Checkout system*

Referring now to FIGS. *5a, 5b, 5c,* and *5d,* which should be read and understood together, and which form respective quadrants of the illustration shown in FIG. 3 in considerably greater detail and with minor modifications, the various card hole locations are illustrated in their application. For example, looking at FIG. *5a,* the many card hole locations designated H, L, or F, followed by numbers identify the particular card hole punched on the punched card, of FIGS. *4a, b* and *c*. It will be understood that a card area, if punched, provides electrical continuity between the lines crossing in FIGS. *5a, 5b, 5c,* and *5d*. In the upper left hand corner, in FIG. *5b* the card reader *1c* is broken down further to the various card hole locations such as M, L, K, or J, etc., and further is indicated the columns in which the hole is located, such as from 1 to 18. Eighteen bits of information then may be obtained on line DH9 from card reference M, 1 to 18 of card reader *1c*. The punched card, if punched at location G23 will cause a relay to be closed and all 18 bits of the information will be connected to be passed through to the input to the comparator 15, as a reference, for example. A hole punched at location G29 of the punched card of FIG. 4 would transmit the 18 bits of information from line DH8 to comparator 15, such information representing the lower limit of the acceptable value, to comparator 15. The 18 bits of information on line DH7 may be transmitted either to the printer 20, by a punched hole at G44 or through the timer 30 by a hole punched at G36. The 18 bits of information on line DH6 may be transmitted to count register *35a*, count register 35, comparator 15, or printer 20, depending on whether holes are punched at G20, G39, G27, or G43. The information on lines DH5 may be sent to digital to analog converter 581 or *5a3*, depending on whether hole locations G31 and G33 are punched. In addition if G37 is punched the information may be transmitted to low frequency oscillator 99 to the frequency or amplitude of oscillation. The several bits of information on line DH4 may be transmitted by a hole punched at G32 to digital to analog converter *5a2*, by a hole punched at G35 to digital to analog converter *5a4*. The several bits of information on input line DH3, arriving from count register 35 may be transmitted to comparator 15 for comparison by a hole punched at G26 or to printer 20 by a hole punched at G42. The information received on line DH2, received from count register 35a may be transferred to become an input to count register 35 by a hole punched at G19, it may be transferred to comparator 15 by a hole punched at G22 (as the upper limit or by a hole punched at G25 as the actual value, or by a hole punched at G28 to comparator 15 as the lower value). It may also be transferred to printer 20 by a hole punched at G41. The 18 bits of information received on line DH1, arriving from the analog to digital converter 26, may be placed in either one of the counters 35 or 35a by holes punched at G38 or G21, or may be placed as the actual value in comparator 15 by a hole punched at G24 or placed in the printer by a hole punched at G40. Converter 100 changes the voltage level of the 18 lines represented as DH3 from —12 volts to +28 volts and the information can thus be entered in bits represented by 28 volt levels to digital to analog converter *5a1*, by a hole punched at G30 or in digital to analog converter *5a4* by a hole punched at G34. Thus it may be seen by the digital switch matrix that all of the input cables thereto, each of which comprises 18 separate electrical connections, each of which represent a binary bit, can be connected to most any place in the system through the digital switch matrix by means of punching of locations along line G of the punched card, FIGS. 4*a, b,* and *c*.

The comparator 15 then on line DV3 receives an upper limit signal which signal may be taken from a counter, or may be taken from a card reference, or may even be generated within the system to be tested. On line DV4 comparator 15 receives the actual value of the signal, that is, the actual signal which is to be compared to see if it falls within an upper limit or a lower limit; such signal may have arrived from the analog to digital converter 26 or may have arrived from one of the counters or may have even arrived from the card reference. In such a case an actual value may be purposely programmed to fall within an outside acceptable limit and the machine can then be checked to see if it agrees. In fact, such a "programmed" value may be run through a considerable portion of the whole system, the digital switch matrix, the digital to analog converters, the analog to digital converters and so on, and then be checked in the comparator for acceptability. Because of this great flexibility self checking and internal checking may be accomplished, in addition to external checking. On line DV5 comparator 15 receives an upper limit value as, for example may be stored in one of the counters or in one of the card reference locations. Comparator 15, which is explained and described in FIG. 9, then provides an output indication indicating acceptability or non-acceptability of the actual value, that is, whether or not it lies within tolerance or specified limits. If the actual value is acceptable and lies within such limits, an output signal is received on line 15a and is transmitted to line A37 which, by reason of card holes punched at locations K20, K19, K21, K22, K23, or K24 may be directed to converter 101, converter 102, converter 103 to provide a "go" light indication at instrument panel 18, inverter 104 or to converter 103 to be passed on to card feed 105, indicating acceptability and allowing progression of the card programming, or to "and" gate No. 2 where it may be combined with some other contingency to provide further control of something else within the automatic checkout system. If the actual voltage received in comparator 15 lies outside its tolerance or outside the desired limits, a signal is received on output lines 15d and is sent to line A37 where it may be further connected to the converters 101 and 102 by card hole locations K26 and K27, to "and" gate 106 by card hole locations K26 and K27, to "and" gate 106 by card hole K28 which further transmits the signal to converter 103 and from thence to the instrument panel to indicate "no-go," to converter 103 and card programmer 105 by a hole punched at K29, if further programming is desired irrespective of the "no-go" indication, and to counter No. 2 to cause it to read its parallel input at this time. An alarm 18a may be connected to be actuated upon such "no-go" or "hi" or "low" indication. In this manner the actual voltage which is being received in comparator 15 and which is unacceptable can also be read into counter 2 where it may be observed to determine its magnitude. Counter 2 could, of course, be filled from the inputs on line DV1 from digital switch matrix 1d with the same actual value that was read into comparator 15. In addition, the printer may receive the signal indicating "no-go" from output 15d of comparator 15. If the actual value received by comparator 15 lies below the lower limit, an output signal is received upon line 15b and sent to line A39 where it may be sent to converter 101 or converter 102 by means of card hole K37 or K36 to count register 35a as an "add" signal or by means of a hole punched at K39 to converter 103 to provide a signal indicating a low value on instrument panel 18. By means of a hole punched at K40 the low indication may also be sent to an "and" gate 53a.

If the actual value received by comparator 15 is above the upper limit the signal may be sent to converter 101, 102, by means of card holes punched at K31 or K32, or to converter 103 to provide a high indication to instrument panel 18 by card punch hole at location K33 or to "and" gate No. 53b by means of a card punched at K34. Therefore the output of the comparator may be received at any one of numerous places and may be used as part of the logic in other combinations.

There are four digital to analog converters *5a1*, *5a2*, *5a3*, and *5a4* (described in greater detail hereafter in reference to FIGS. 7 and 8). Two of the converters may be D.C. and two of which may be A.C. As these converters receive digital inputs from the various input sources explained previously, analog outputs are provided to lines A40, A41, A42 and A43 by means of direct connection or by means of card hole locations L44, L41, L38 or L40. Output cable 41 may be connected to receive (on any one of its four lines) the various generated voltages from the digital to analog converters. Cable 41 in FIG. 5*b* provides four lines of input to the patch matrix which is described hereinafter in FIG. 10. Therefore, any one of the D.C. or A.C. voltages generated in the digital to analog converters 5A1, 5A2, 5A3, or 5A4 may be connected to be applied to the system under test. In addition through card hole locations H23, H24, H25, or H26 any one of the digital to analog converters may be connected to provide an analog input to analog to digital converter 26. Attention is here called to the fact that digital to analog converter 5A1 may of course have received its control information from a card reference through hole G31 having been punched or may also have received its information from count register 35 through converter 101 by means of a hole punched at G30.

Digital to analog converter 5A4 may be used to proprovide an output to the system under test through a hole punched at L38 or L40 and may also be used to directly fill the analog to digital converter 26 by means of a hole punched in H23. Information may further be shifted from digital to analog converter 5A1 to digital to analog converter 5A2 by means of the hole punched at L23. The output of the digital to analog converter 5A1 may be reversed by a hole punched at A42 which reverses the polarity of the voltage within the converter.

Digital to analog converter 5A2 may receive information from digital to analog converter 5A1 as just previously explained through a hole punched at L23 or may also receive information from card reference area B1–18 on line DH4 through a hole punched at G32. The voltage provided by digital to analog converter 5A2 may be reversed by a hole punched at A43 which provides a reversal polarity of voltages within the converter. The phase of the digital to analog converter 5A3 may be shifted 90° by a hole punched at H38. The phase of the digital to analog converter 5A4 may be shifted 90° by a hole punched at G45.

Both of the above digital to analog converters 5A1 and 5A2 are D.C.

If an A.-C. value is desired to be generated, digital to analog converter 5A3 or 5A4 are used. Digital to analog converter 5A3 is always connected to provide an output on one line of cable 107 and no card hole punched is necessary to complete the circuit. It also may be connected through a hole punched at H25, to the analog to digital converter 26 or a hole punched at L24 to digital to analog converter 5A4. Inputs to this digital to analog converter may be received from card reference area G1–18, lines DH4 as previously explained through a hole punched at D31 in the digital switch matrix.

Digital to analog converter 5A4 may be used to provide an output through a hole punched at L44 on one of the outputs of cabled line 41 and also may be used to provide an output to the analog to digital converter 26 through a hole punched at H26. Digital to analog converter 5A4 may be connected to receive information through a hole punched at L26, receiving the information coming in on line A13 which information of course may have originated in the system under test and is desired to be inspected. Further it may be desirable to provide an analog voltage according to the input voltage received through connection at switch L26. In addition a suppressed carrier signal may be received from the low frequency oscillator 99 through a hole punched at L25, or a transfer of information may be received from digital to analog converter 5A3 through a hole punched at L24 as previously mentioned. The signals received through holes L26, L25 or L24 are analog voltages and are not parallel inputs in the binary form. Such parallel inputs in the binary form are received through holes punched at G35 from card reference area D1–18 or from count register 35 through converter 100 by means of a hole punched at G34.

*Analog to digital converter and input*

Figure 6A:
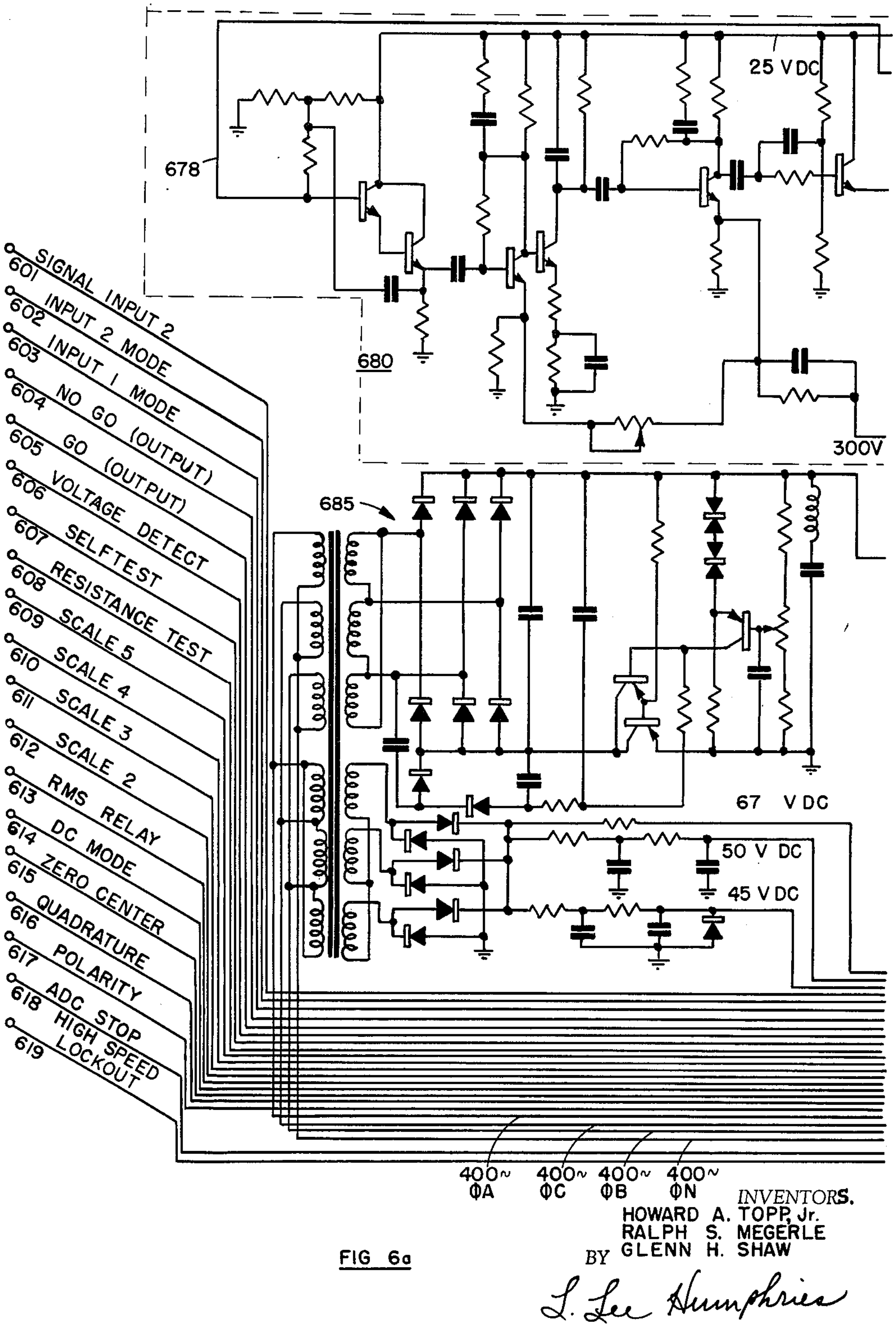
Figure 6B:
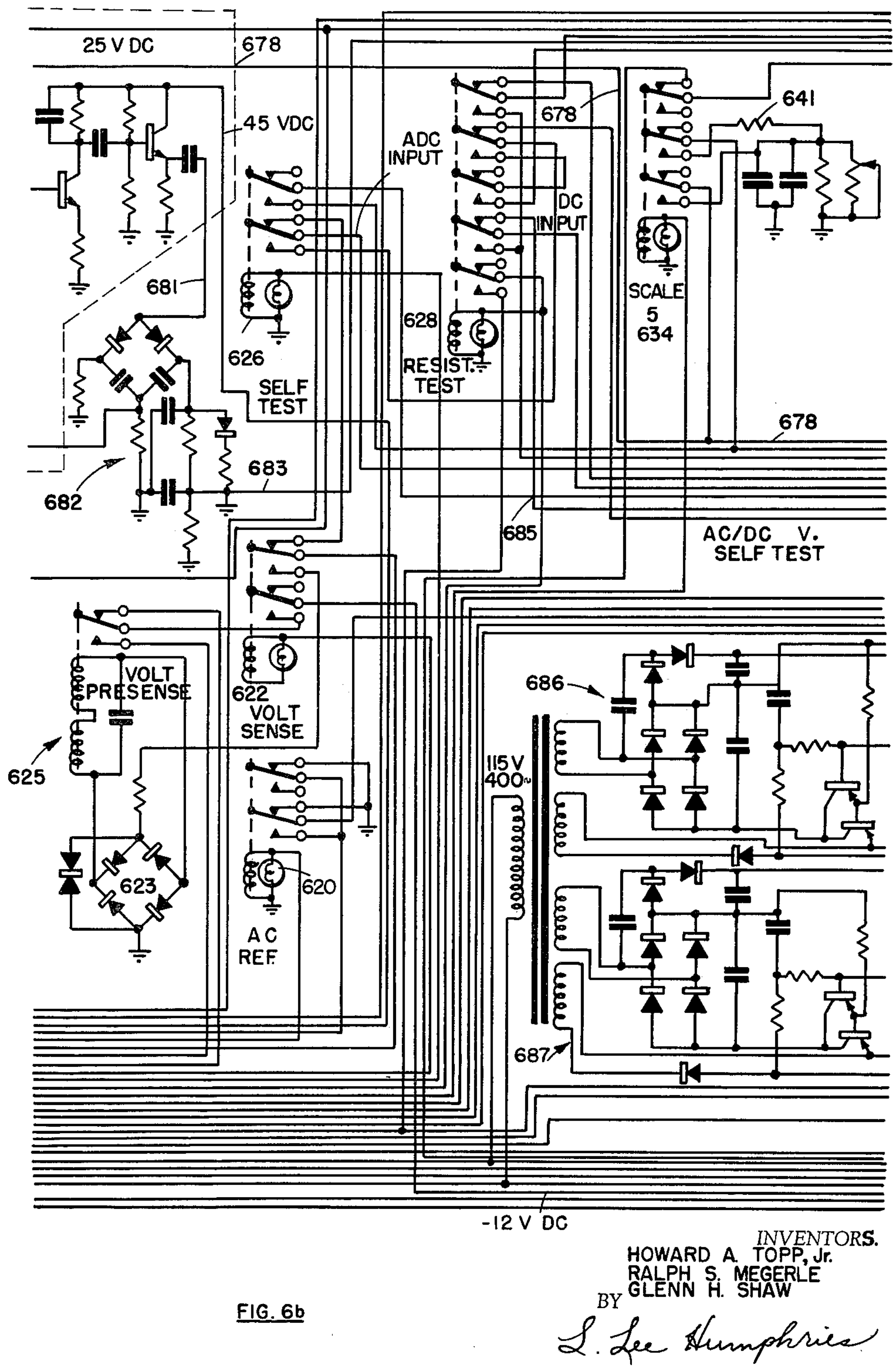
Figure 6C:
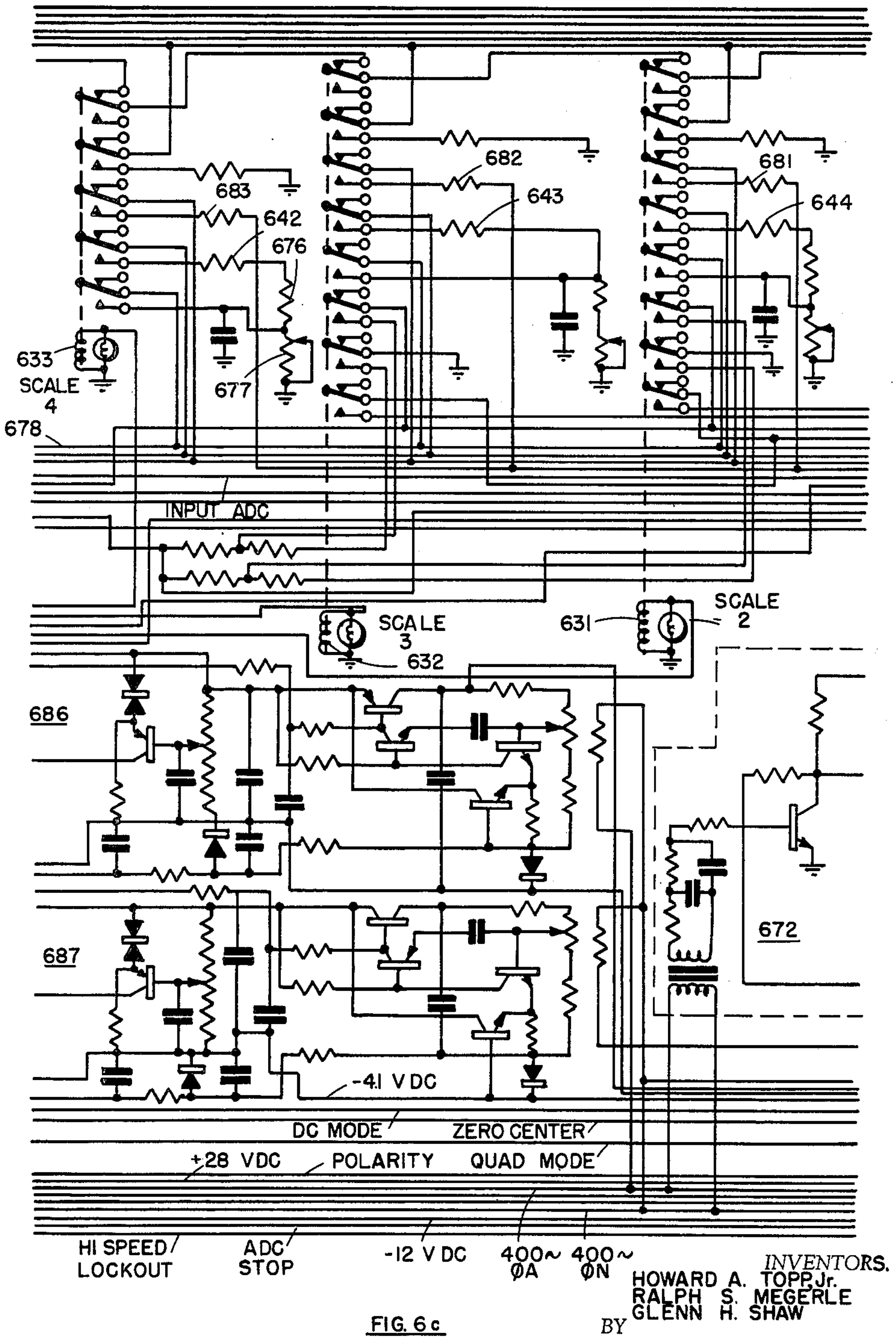
Figure 6D:
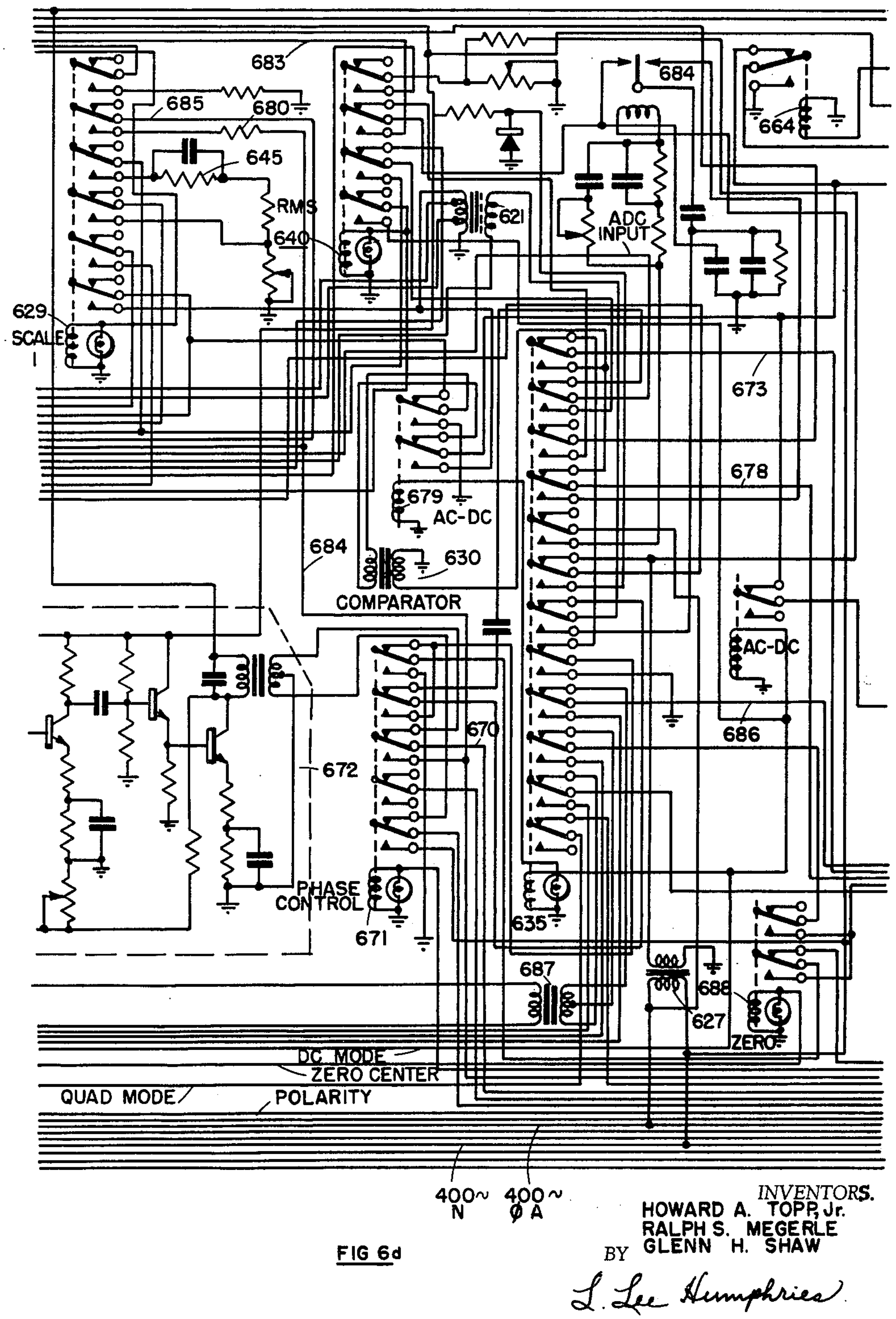

Referring now to FIGS, 6*a* through *h* which are succeeding sections reading from left to right of the analog to digital converter 26 of FIG. 3 (including its input circuits) the inputs are illustrated at the left in 6*a* and comprise inputs 601 through 619 which in turn is comprised of various control inputs and signal inputs. It may be understood then that a signal received at this end is to be converted from an analog signal into a digital signal. Referring momentarily to FIG. 6*g*, which shows an analog to digital converter 646 having an input shaft rotation (the analog signal) by means of shaft 675 and a digital output signal on lines such as 647 and 648.

In referring to each relay hereinafter, the relay connections are not numbered on the drawings but are to be referred to as connection at 1, 2, or 3, etc., reading from the top of the drawing down including each switch element as well as its two contact elements.

The converter 646 is shown comprised of two portions 646*a* and 646*b*. The particular type of converter used herein is a code wheel portion 646*a* and logic circuitry 646*b* which is well-known in the art to remove code wheel uncertainties and errors. Such devices in themselves form no inventive concept claimed herein and, consequently, their details are not shown.

*High and low speed servo*

Figure 6E:
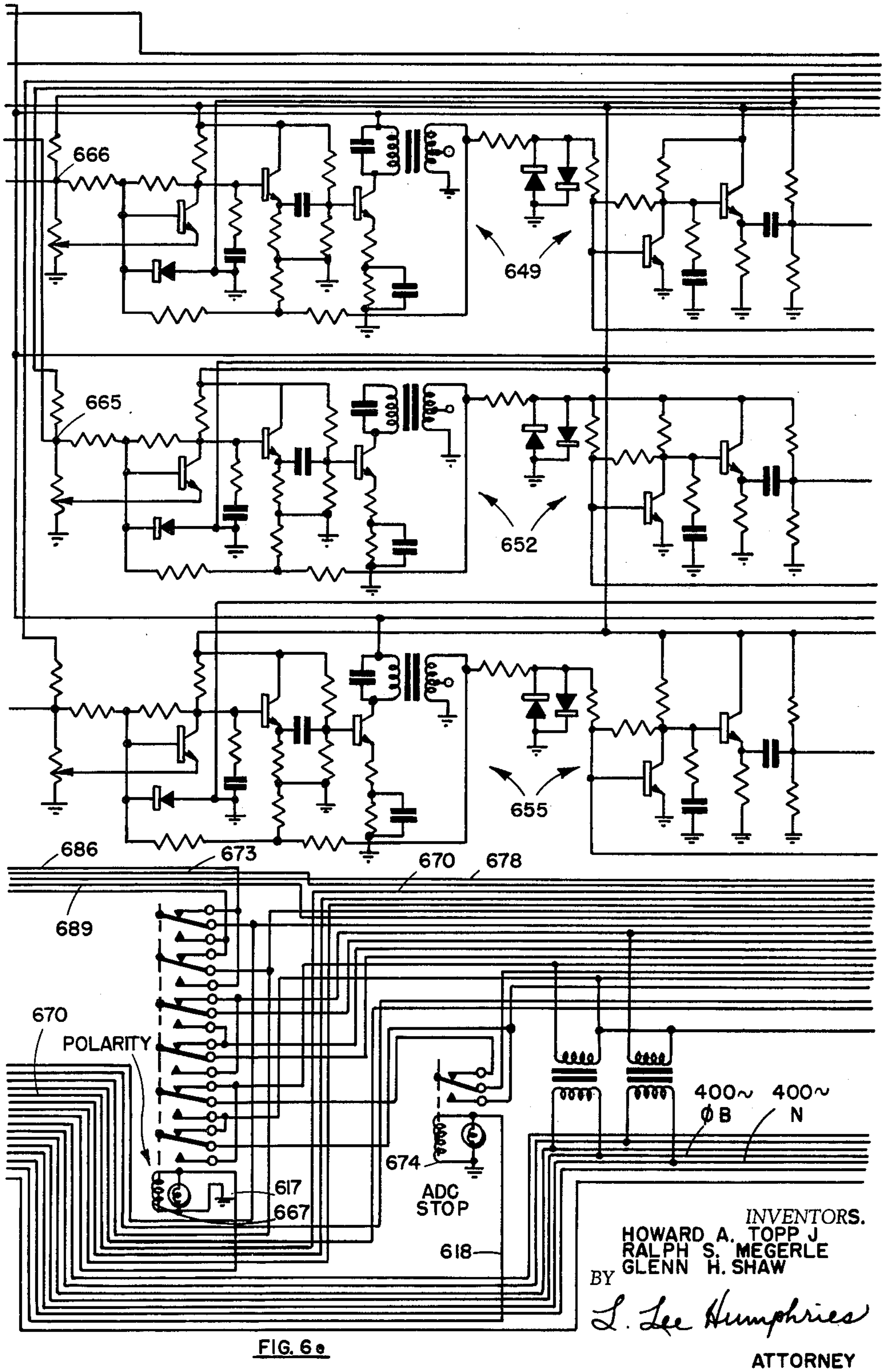
Figure 6F:
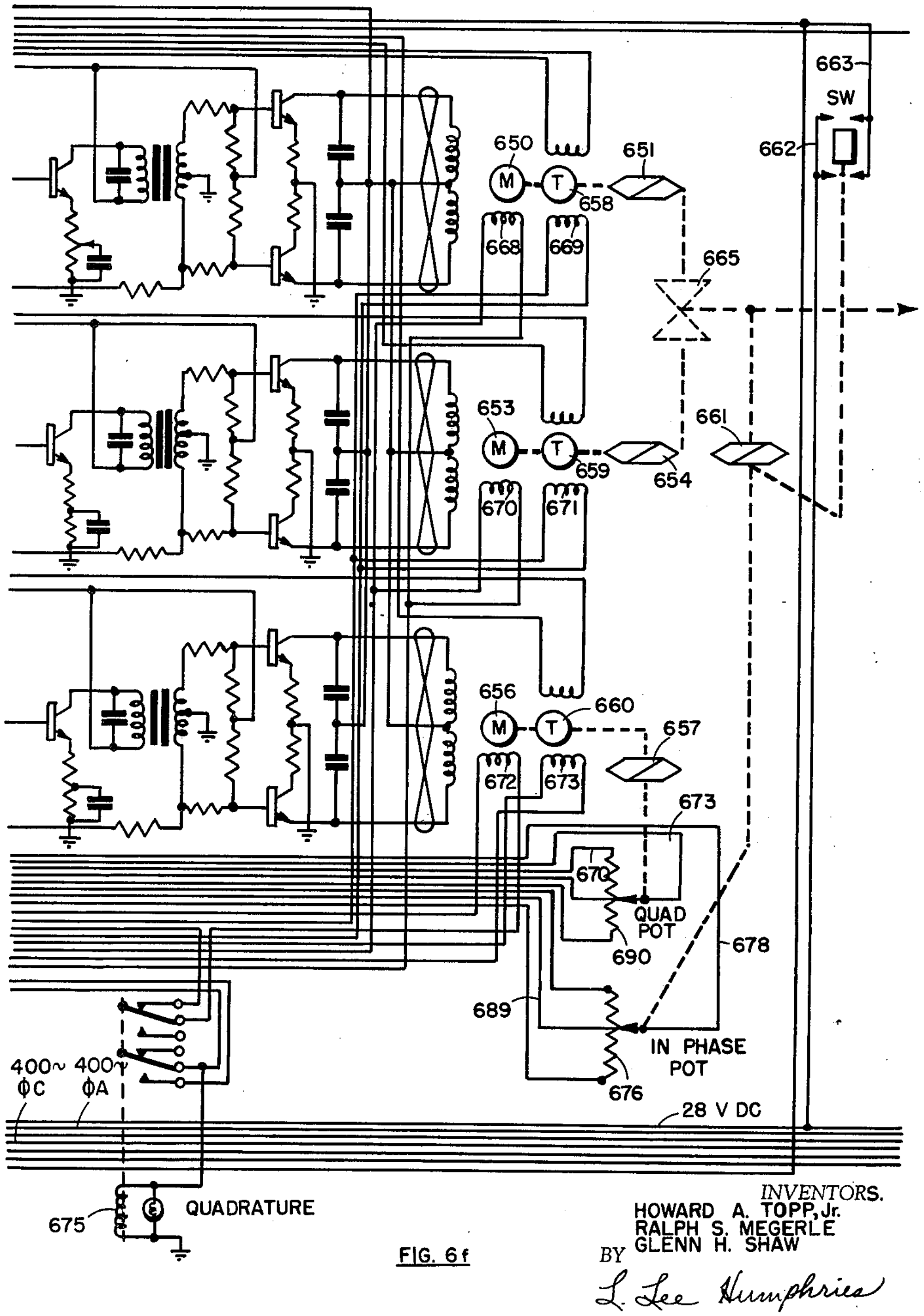
Figure 6G:
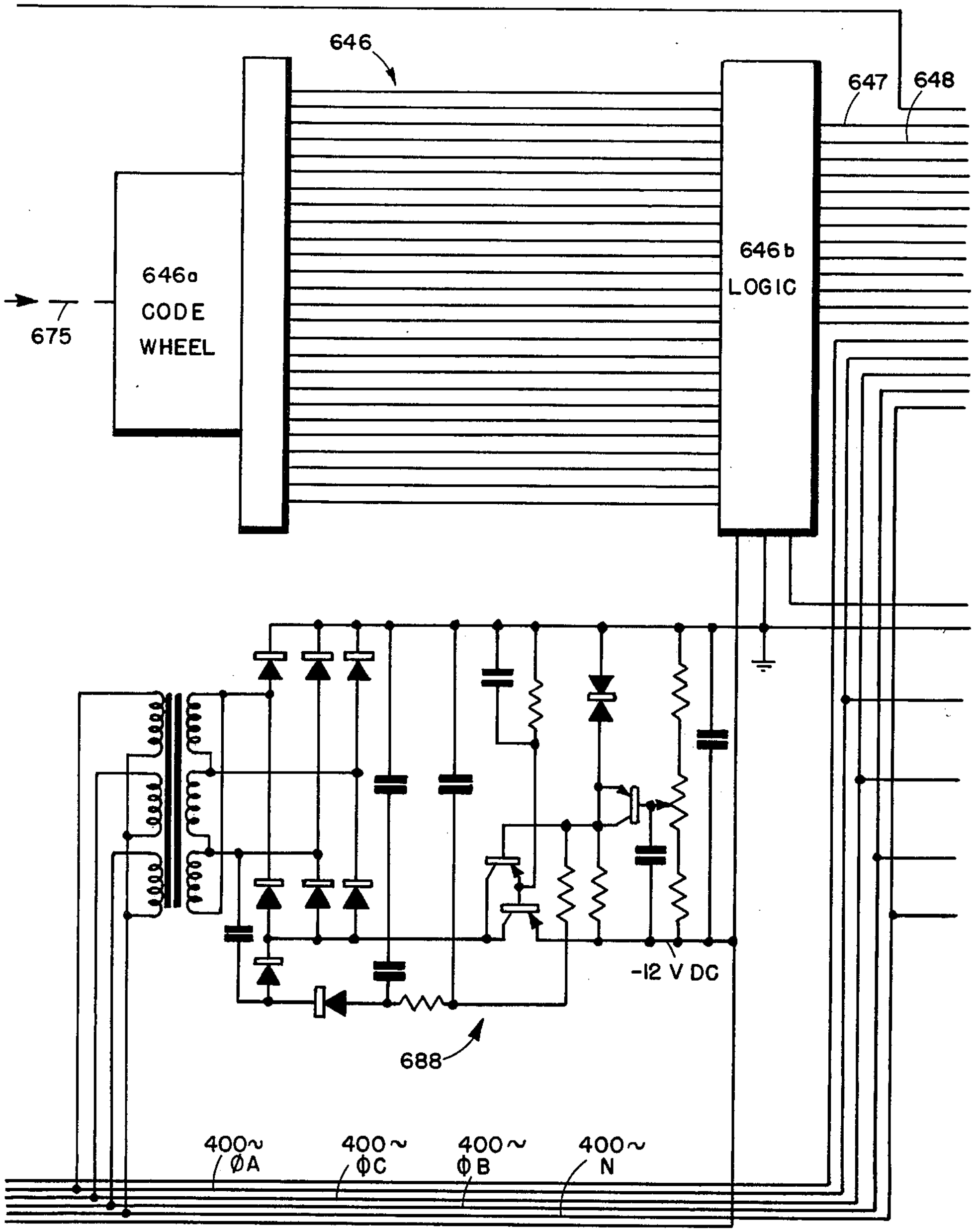

The shaft input to analog to digital converter 646 is obtained from two servo circuits illustrated in FIGS. 6*e* and 6*f*. There is a low speed servo circuit comprised of amplifier 649, a phase reversible A.-C. motor 650, and a gear reduction unit 651. There is also a high speed servo amplifier comprised of amplifier 652, a phase reversible A.-C. motor 653, and a gear ratio increaser 654. The high speed and the low speed servos are coupled together through a differential gear 655 so that each can separately drive the analog to digital converter in either direction, without interference with the other servo drive circuit. Each of these servo systems has tachometer feedback for stability indicated at 658 and 659. A gear reducer 661 drives an extreme end limit switch 662 which, when a certain position is reached, closes and provides an electrical signal on line 663 from the 28 volt D.-C. source, to cause relay 664 to become actuated and the input to the high speed amplifier 652 at point 665 is connected to ground and therefore only low speed amplifier 649 is receiving the input signal at input junction 666 and no connection is made to the input high speed servo amplifier 652 by reason of relay 664 having been energized. In this manner the analog to digital converter can be driven at a high speed or at a low speed. There also may be fed a signal at input 619 which will actuate relay 664 to lock out the high speed servo.

*Polarity reversal*

If it is desired to reverse the polarity of the analog to digital converter, a signal on input line 617 actuates relay 667 and reverses the phase of the A.-C. signal received by coil 668 of motor 650, 669 of tachometer 658, 670 of motor 653 and 671 of tachometer 659 and coil 672 of motor 656 and 673 of tachometer 650.

*Analog to digital converter stop*

In addition a stop signal received on input 618 will energize relay 674 and disconnect the power entirely to the motor 656, 653 and 656, and the analog to digital converter is stopped.

*Servo feedback circuit (in phase)*

As motor 650 or 653 rotates the analog to digital converter shaft 675, the wiper of potentiometer 676 is driven accordingly and provides a voltage which indicates its position, such voltage being fed back on line 678 to connection 11 of A.-C. D.-C. control relay 635 which, in the A.-C. mode will connect the feedback potentiometer signal to the primary of comparator transformer 630, the secondary of comparator transformer 630 on one terminal receives a signal through connection 2 of A.-C. D.-C. relay 679 connection 2 may be connected, for example to connection 1, receiving then an A.-C. signal through one of scaling relays 629, 631 or 632 which, in turn, according to scale selection on input lines 609, 610, 611, or 612, FIG. 6*a*, receives the output of transformer 621, FIG. 6*d*. Transformer 621 is connected to receive various inputs such as the signal which is to be inspected from the system under test, as will be explained hereinafter. The other end of comparator transformer 630 is connected to provide an output signal, which signal will be the difference between the feedback signal from in phase potentiometer 676 and the input signal received by comparator 630 and this difference signal, or error signal will be transmitted through connection 4 of relay 679 to connection 5 and thence to the input to the low speed and high speed amplifier servo systems at connections 666 and 665, FIG. 6*e*.

The lower end of in phase potentiometer 676, FIG. 6*f*, is connected to receive, for example, an 8 volt, A.-C. excitation signal through polarity relay 667, connections 1 and 2, and line 686, FIGS. 6*e* and 6*d*, through A.-C. D.-C. relay 635 from transformer 687 which in turn is connected to receive 400 cycle phase A excitation. The center connection of in phase pot 676 may be controlled in its potential by an input zero center signal on input line 615, FIG. 6*a* which actuates zero relay 688 to cause the center tap of in phase pot 676 to become connected through line 689 to connections 3 and 6 of zero center relay 688 which, in turn are connected to connections 2 and 5 when the relay is energized for zero center. Connection 2 of that relay connects to connection 29 of A.-C. D.-C. relay 635 which may be connected to receive a voltage from transformer 687, the center tap voltage of transformer 687. Thus at this time it becomes connected to provide the center tap potential of potentiometer 676 if zero center relay 688 is energized. The top end of transformer 687 is connected to provide through connections 4 and 5 of the polarity reversal relay 667, and connections 31 and 32 of A.-C. D.-C. relay 635, and the other end of transformer 687 to excite the in phase potentiometer at its upper end. The polarity relay 667, of course, interposed may be utilized to reverse the potential from transformer 687 which is applied to in phase pot 676.

*Quadrature servo*

A quadrature potentiometer 690 similar to in phase potentiometer 676 also is excited on line 670 through connection 8 and connection 7 of phase control relay 671 to a quadrature power source 672, FIGS. 6*c* and 6*d*. The other end of the quadrature potentiometer 690 is connected through the same relay to the same source 672.

The wiper of potentiometer 690 is connected on line 673 to connection 2 of A.-C. D.-C. relay 635, FIG. 6*d*, and from connection 1 to connections 22 and 23 and thence to connections 1 and 6 of phase control relay 671. Through connections 6 and 5 the wiper is then connected through connections 19 and 20 of A.-C. D.-C. relay 635 to excite transformer 621 whose output may be scaled to drive the high or low speed servo systems as explained under the Servo Feedback Circuit paragraph above. The quadrature servo amplifier 655 also receives at point 674 the same scaled error signal sent to the high and low speed servo amplifiers at their respective input junctions 666 and 665.

In this manner, when measurement of quadrature voltage is desired, a quadrature mode control signal on input line 616 throws quadrature relay 675 which, through connections 5 and 6 throws phase control relay 671 to throw the servos into quadrature mode and quadrature inputs can then be measured.

Referring to FIG. 6*f*, quadrature potentiometer 690 is driven by quadrature servo motor 656 through gear train 657. The output of the quadrature potentiometer is then mixed with the input signal to the error amplifier, the difference between the two signals being amplified and used to drive the quadrature servo motor until the voltage from the quadrature potentiometer is equal to the quadrature component of voltage contained in the input signal. Hence, a voltage is now available on the quadrature potentiometer which is equal to the quadrature content of the signal and may be measured at any time after the input signal is removed.

*Signal inputs*

FIGS. 6*a* through 6*h* which should be arranged together from left to right to form one complete schematic diagram, as explained previously, show in schematic detail the input circuits to the Analogue to Digital Converter, the power sources and control inputs to the analog to digital converter. This converter, of course, receives an analog voltage, that is, one which indicates, for example, an output signal being received from the system under test. It is desired to transform this signal into digital form in order, for example, to compare it in the digital comparator 15 of FIG. 3. At the same time, various control signals are received at the digital converter in order to control it, such as to control the mode the converter operates in or to control the scale of the converter. There may be a control signal which sets, or reverses, the polarity of the converter, a signal which controls any one of several scales, an R.M.S. control signal (the converter will then receive any signal for example, 30 to 10,000 cycles per second, rectify it and determine its R.M.S. value, chop it at 400 cycles and convert that to a digital signal), a phase control signal (to allow a determination of the amount of phase shift or values of quadrature voltages), a voltage detection control signal (to determine whether a voltage exists on a test lead, for example), an A.-C. D.-C. control signal, a center zero signal, a resistance mode signal (for determining resistance values) or a self test mode signal (to allow self checking to determine if the automatic checkout device itself is operating correctly).

Referring now to the FIGS. 6*a* through *h* which are succeeding sections reading from left to right, respectively, of the input to the analog to digital converter 26 of FIG. 3, the inputs are illustrated at the left, in FIG. 6*a*, and No. 601 indicates signal input No. 2. The numeral 602 indicates the terminal receiving the control signal placing the analog digital converter in a double ended mode so as to receive the signal input on both lines 601 and 602. That is, the input on line 602 actuates A.-C. reference relay 620 which is shown as having a neon bulb connected thereacross to indicate when the relay is actuated.

When line 602 then is energized to place the analog to digital converter in the double ended input mode, relay 620 is energized and the input received on line 601 travels to connections 2 and 6 of relay 620, and through connection 5 is transmitted to a scaling transformer 621 as an input to the primary side. If relay 620 had not been energized to place the analog to digital converter in the input mode the input on line 601 would be connected through connections 1, 2 and 4 of relay 620 to be connected to ground, providing single ended input (the input being solely on input line 603). If connected for double ended input the voltage on input line 603 must reach the other terminal of transformer 621 which it does through connections 1 and 2 of relay 622, connections 4 and 5 of relay 626, connections 5 and 4 of relay 635, FIG. 6*d*, connections 3 and 4 of phase control relay 671 and connections 19 and 20 of A.-C. D.-C. relay 635.

*Voltage detect*

Input 603 represents signal input 1 and the signal is received at connection 2 of voltage sense detector relay 622. Therefore, when a voltage detect signal is received on line 606 to cause relay 622 to be actuated, the input signal on line 603, signal input No. 1, is transmitted to connection 2 and thence to connection 3 of relay 622 where it is sent to a diode bridge 623 for demodulation. A zener diode 624 is connected across the bridge to prevent the amplitude from becoming too large. The output of the bridge is used to drive relay 625 which, for example, is designed to trip only upon receipt of a certain minimum voltage, say for example, two volts. If the voltage received is two volts, or above, relay 625 is actuated and the output on line 605, "go" is no longer connected to be actuated by a 12-volt D.-C. source, but, rather, the 12 volt D.-C. source is now switched to be connected to connection 3 of relay 625 and a voltage appears on output line 604 indicating "no-go." This shows, for example, how that the system under test can be looked to in a preliminary manner in order to determine that there are no voltages above two volts (or any other value desired) present within the system. However, upon detection of such voltage, it is indicated that there is such voltage present within the system, the test is not ready to proceed and a "no-go" signal appears. Therefore, a voltage presence system is set up in the analog to digital converter input.

*Self test*

If voltage relay 622 is not actuated the input signal received on line 603 would have continued through connection 2 to connection 1 of relay 622 and passed into the connection 4 of self test relay 626. If self test is desired a signal is received on line 607 and the self test relay 626 is actuated and the input signal 1 goes no further than connection 4 of relay 626. However, an A.-C. D.-C. voltage for self test, received at connection 6 of relay 626 is connected to connection 5 of relay 626 which, sends the input, through various other relays to transformer 621. The self test voltage received at connection 6 of self test relay 626 may have originated, for example, in transformer 627, FIG. 6*d* which is connected to receive on one side of its primary one phase of 400 cycles for example, and at the other side of its primary the neutral or ground of the 400 cycle signal. Therefore, the device by looking at a known signal and sending the signal on into the analog to digital converter can determine whether its own self is functioning correctly.

*Resistance test*

If an input signal is received at terminal 608 indicating a resistance test should be made, resistance test relay 628 is actuated and by reason of connections 14 and 15 locks itself in until the D.-C. mode signal is no longer present. While locked in resistance test mode, some unknown resistance connected between 603 and ground (single ended input) or between input 603 and 601 (double ended input) would be connected through connections previously pointed out under signal inputs. However, at connection 5 of relay 635 (energized) connection is made to connection 6 and the unknown resistance is then connected to connections 8 and 7 R.M.S. relay 640 (energized). From relay 640, connection is made to connections 11 and 12 of resistance test relay 628 (energized). From connection 12 of relay 628 connection is made on line 684 to the upper end of in phase potentiometer. The voltage across the unknown resistor may be obtained from a standard resistor in series with a precision reference voltage (not shown).

*Resistance self test*

If self test relay 626 is energized the input signal sources 602 and 603 are disconnected and the input to connection 5 of A.C.-D.C. relay 635 is provided with connection through the resistance test relay 628 (energized) and through one of the scaling relays 629, 631, 632, or 633 through a particular one of resistors 636, 637, 638 and 639 to ground. Then depending on which scaling relay is energized the circuit to ground is completed through a known resistor to ground. The system can thus provide a resistance self test by throwing into the circuit a known resistor of selected scale. A.C. 400 source 627 may be connected during such a test (through relays 640, 626, and one of the scaling relays 639, 631, 632, 633 or 634) through one of scaling resistors 641, 642, 643, 644 and 645 to ground. The voltage so developed across the scaling resistors is fed through connections 8 and 9 of R.M.S. relay 640 to connections 5 and 6 of A.C. D.C. relay 635.

*D.C. to ten thousand cycle test*

If a D.C. signal or some other signal is received (other than the standard A.-C. frequency which is herein assumed to be 400 cycles) it may also be analyzed because of the flexibility and adaptability of the Automatic Check-Out Equipment, the A.C. D.C. relay 635 is energized and the analogue to digital converter input signal instead of traveling from connection 5 to connection 4 now travels from connection 5 to connection 6, thence to connections 8 and 9 of R.M.S. relay 640 (energized) through the selected scaling relay (relays 629, 631, 632, 633 or 634) to ground. If, for example, scaling relay 633 is thrown, the input voltage is then expressed across resistors 642, 676 and 677 to ground. A tap across resistor 677 transmits this D.C. or A.C. voltage to connection 15 of scaling relay 633 (energized) thence to connection 14 and from there on line 678 to the base of transistor 679, FIG. 6*a*. Transistor 679 is the input of an amplifier 680, FIGS. 6*a* and 6*b* (which amplifier has a wide frequency response). Connected to receive the output on line 681 of amplifier 680 is a rectifier circuit 682 whose rectified output is transmitted on line 683 to connections 6 and 5 of R.M.S. relay 640 and thence to the input contact on the left of chopper 684, FIG. 6*d*. The vibrating reed first touches the input contact on the left, then the input contact on the right. The right contact feeds back the output of the wiper of the in phase potentiometer 676. Thus the chopper will connect first to the input signal being measured and then the potentiometer wiper. If any difference exists an A.C. signal is thus generated which goes to connections 21 and 22 of A.C.-D.C. relay 635 (energized) for transmission to scaling transformer 621 for scaling and further transmission to servo input junctions 666 and 665.

*Power supplies*

Figure 6H:
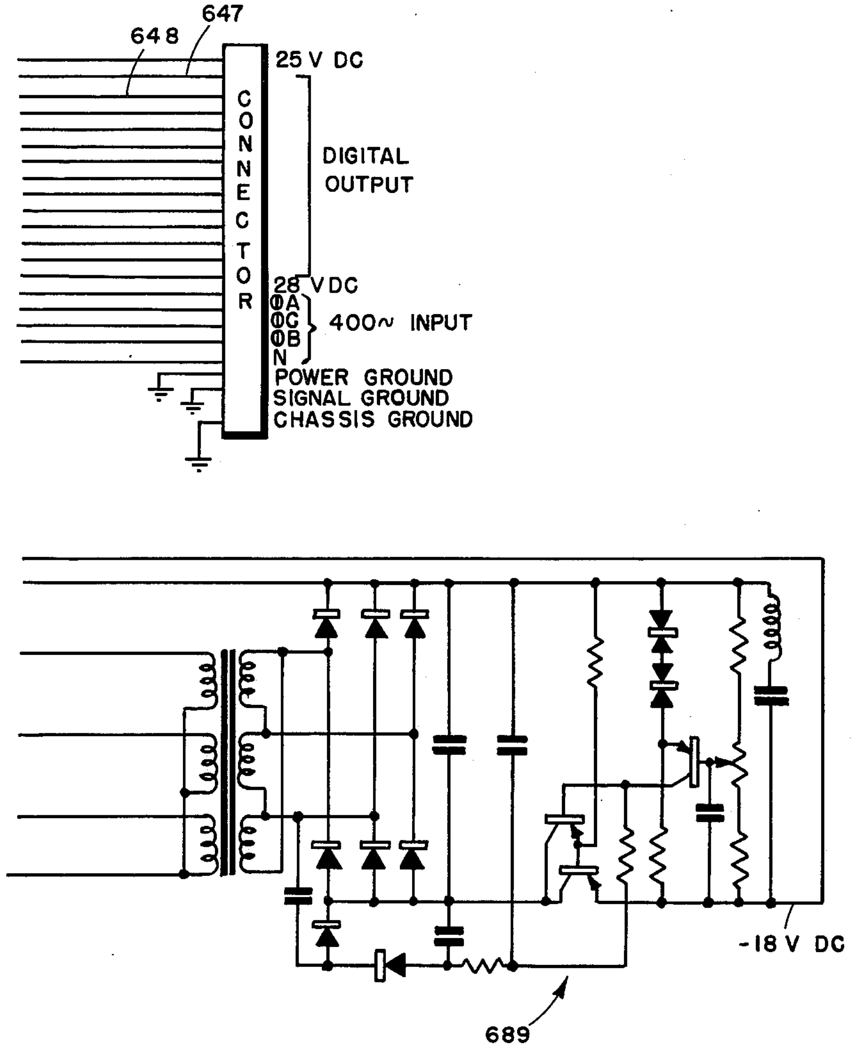

In FIG. 6*a*, various D.C. voltages are produced by a power supply 685, indicated generally. Also, in FIGS. 6*b* and 6*c* are two more power supplies 686 and 687. In FIGS. 6*g* and 6*h* are two other power supplies 688 and 689.

*Voltage scaling*

Transformer 621 receiving, then, a signal input at its primary has a secondary including several taps; and this transformer, therefore, provides a scaling means for an electrical signal. It is noted that the highest voltage tap of the secondary is connected to connection 18 of scale 1 relay 629. Therefore, if this relay is energized, scale 1, the highest voltage output of transformer 621 is transmitted through connection 17 of relay 629 to comparator transformer 630. If however scale 2 relay 631 had been energized, the next highest tap on transformer 621 would have been connected to comparator transformer 630 through connections 23 and 24 of scale 2 relay 631. If the scale 3 relay 632 had been energized, the third voltage tap on the secondary of transformer 621 would have been connected through connections 23 and 24 to comparator transformer 630. Therefore, whatever signal is being sent into transformer 621 whether it is being provided from the outside or whether it is being provided from a self test or a resistance test check, it may be scaled according to any one of the desired scales by energizing scaling relays 629 through 634. The scaling relays are operated by external control signals except for scale relay 629 which by means of a continuity circuit through each of the other relays automatically is actuated by the 28 volt D.-C. source if none of the other relays are energized.

*A.C. digital to analog converter*

FIG. 7 illustrates one form of a typical A.-C. digital to analog converter. In the embodiment used for illustration, it consists essentially of a relay-controlled variable ratio transformer indicated generally at 701. The input to this variable ratio transformer may be received from a fixed A.-C. reference source through transformer 702 or from an external source on anyone of lines 703, 704, or 705, depending on whether or not holes are punched at the punched card locations L24, L25 and L26. If it is desired to reverse the polarity or phase, a hole punched at G45 will actuate relay 706 which reverses the input polarity or phase, to variable ratio transformer 701. By a hole punched at B1 on the card, a D.-C. voltage excites relay 707 which connects the primary of variable ratio transformer 701 to receive such external outputs. If in the digital switch matrix 1*d* the hole G35 is punched, a relay is energized and the various binary digits B3, B4, B5, B6, etc., possibly to B18 are connected to energize relays 708, 709, and 711 which are illustrative of any number or series of relays which change the ratio of the transformer and provide a digitally-controlled analog output at output winding 712. If a hole is punched at L44 then in the punched card, the digital to analog converter provides an output on line 41 going, for example, to the system under test. A hole punched at the location H26, of course, may be used to send the analog voltage to the analog to digital converter 26. The showing of FIG. 7 is the illustration of digital to analog converter 5A4 of FIG. 5*b*. It may be appreciated, then, that any voltage be sent to this digital to analog converter, on line 703 and such voltage may be scaled according to a digital number operating the relays 708, 709, etc.

Figure 7A:
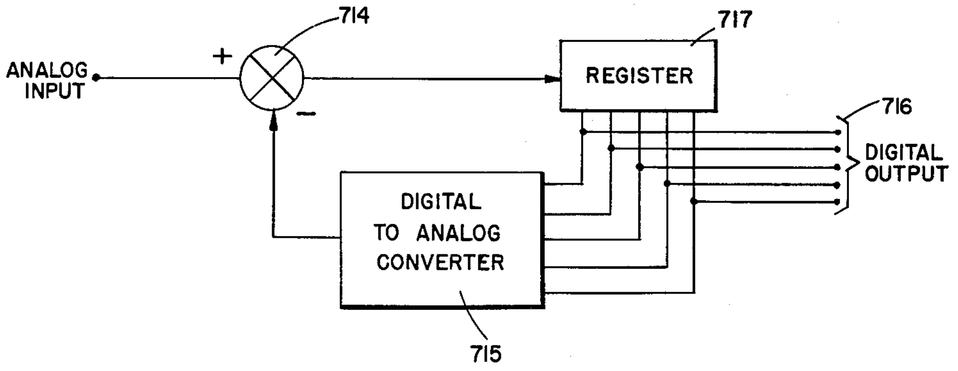

FIG. 7*a* shows how the digital to analog converter may be used to provide an analog to digital converter. An analog input fed to a difference point 714 drives a register 717 whose output is connected in parallel to control digital to analog converter 715 which converts the bits back into analog form and feeds difference point 714 to be compared to analog input. Register 717 then fills up until converter 715 matches the analog input to point 714 whence the register 717 reads the correct binary number and the output may be obtained on lines 716, it being digital.

*D.C. digital to analog converter*

FIG. 8 shows a D.-C. digital to analog converter. Such a converter may, of course, be constructed by the use of a simple voltage divider in which various resistive elements are inserted or shunted in response to relays actuated by the digital input in order to provide an analog output which is a function of the digital input. In FIG. 8 is shown a D.-C. source with a center connected to ground and having a positive output and a negative output with respect to ground. Relay 801 may be utilized in response to a hole punched at card location A43 to reverse the polarity of the input to the converter. Relay 802 may be used to shift the input of the converter from D.-C. source 803 to that coming in on line 804 providing a hole is punched at location F23. Relays 805, 806, 807, 808, 809, 810, 811 and 812 are energized by the incoming bits on table DV7 (FIG. 5*b*). There are shown only 8 incoming lines 813 through 820 which, of course, are connected to receive the incoming bits in order of increasing significance, respectively. An output then is received on line 821 which is positive or negative in accordance with the input digital number.

The digital to analog converter 5A2 which is illustrated in FIG. 8, may of course, be connected by a hole punched at L23 and by energization of relay 802 to receive an analog voltage directly which it may pass with or without scaling further according to digital inputs.

*Printer*

Figure 5A:
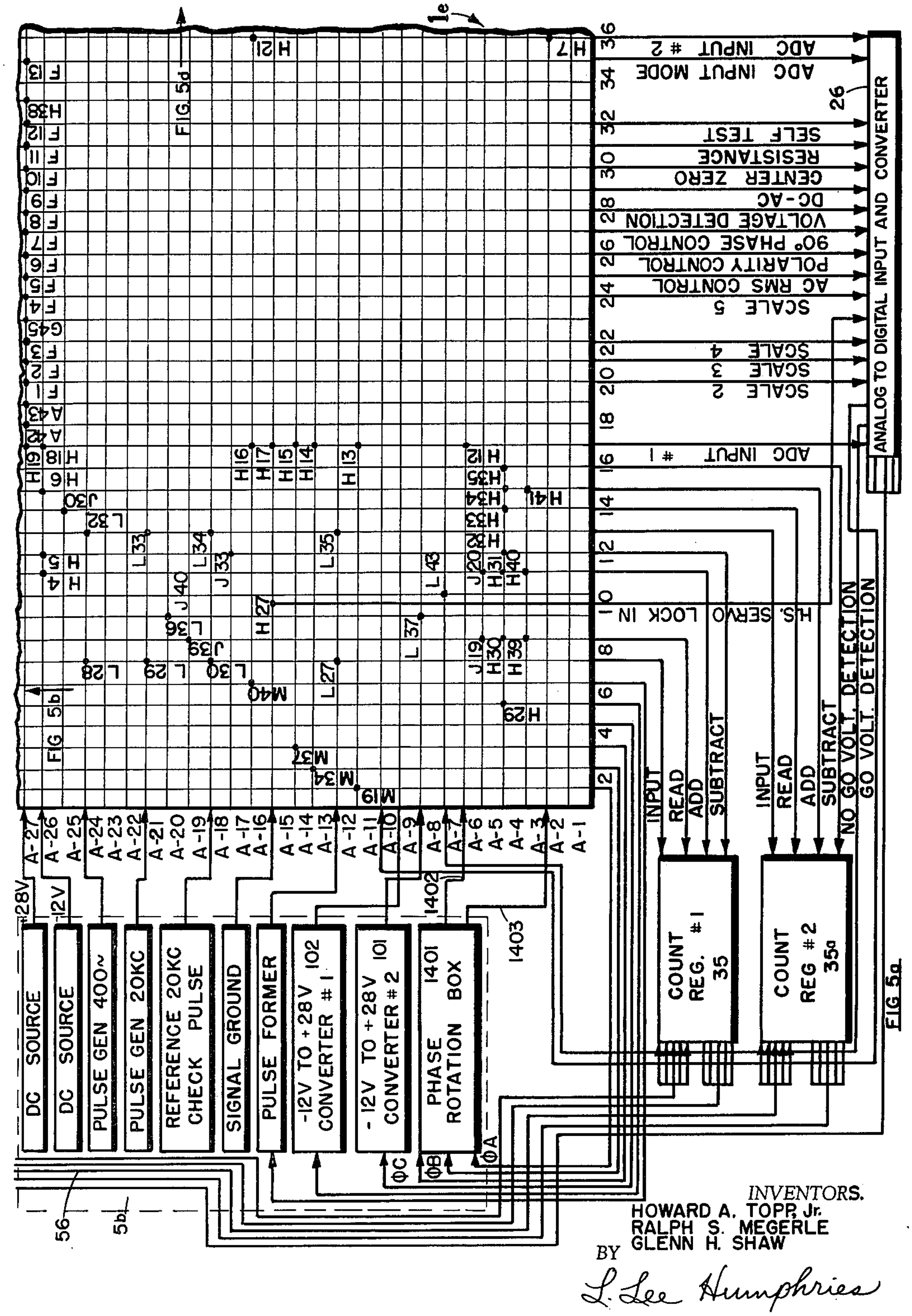
Figure 5B:
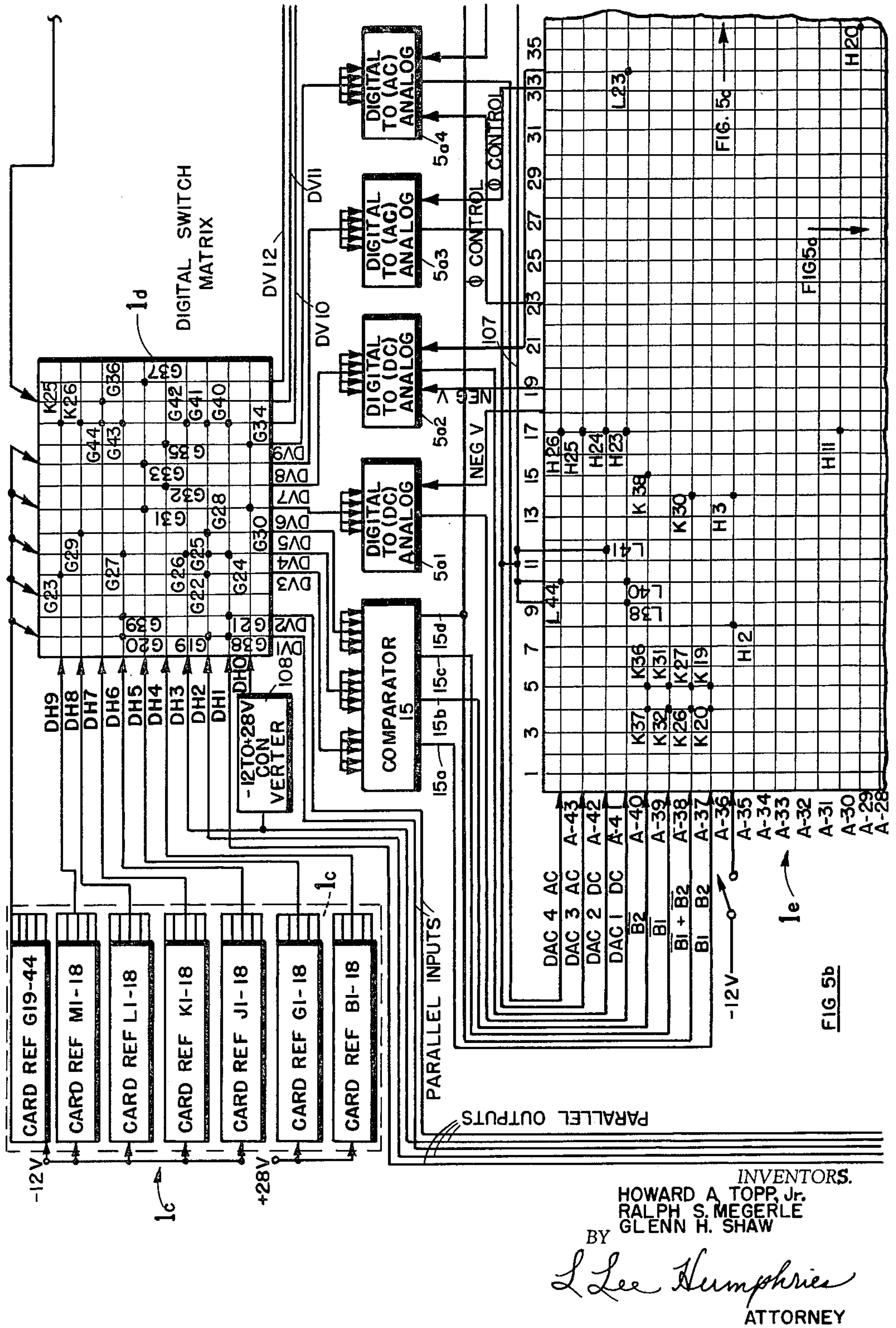
Figure 5C:
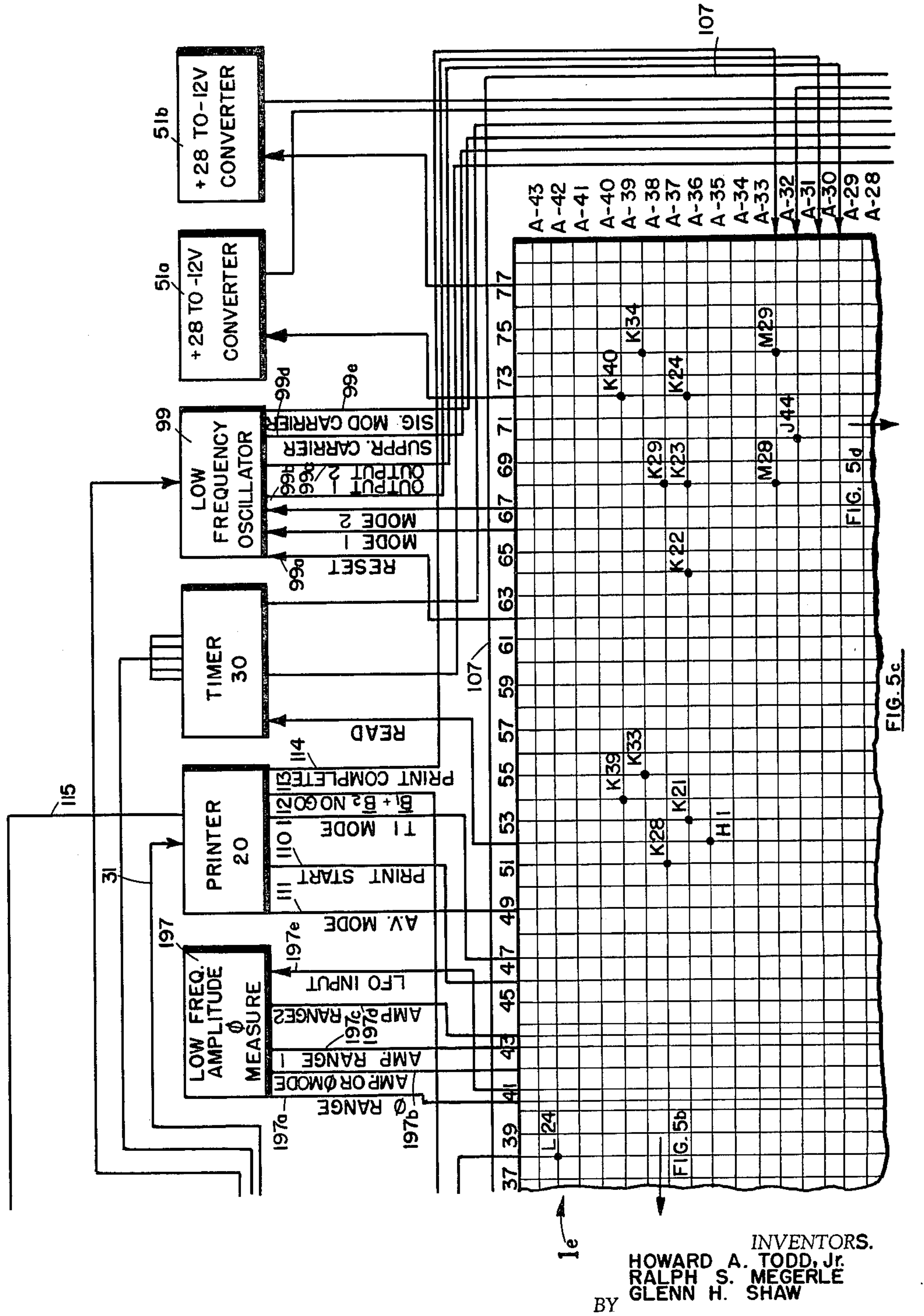

In FIG. 5*c* is shown printer 20 which receives on cabled line 31 (which consists of 18 wires—one for each bit of information) digital information from digital switch matrix 1*d*. The printer is capable then of printing such values received in digital form. A print start signal is received on line 110 which may have originated by reason of a hole punched at location H8 in the punched card which would provide a —12 volt signal from one of function generators 5*b*. Print start could also have been controlled by a hole punched at J25 which then would not have allowed starting until a predetermined time delay according to timer 30. In addition, print start could have been commenced by a hole punched at J41 which would have received a signal from converter 51*b*. The start of the printer could have been made contingent upon two different factors by reason of a hole punched at H36 which then would receive a signal from "and" gate 53*a* when both inputs were present to such gate. A hole punched at J21 would have allowed print start according to the output of inverter 104. A hole punched at H42 would have allowed an output according to "and" gate 53*b*. In addition, a hole punched at M25 would allow manual control of print start.

Referring momentarily to the input to printer 20 on line 30, it may be appreciated that the input may have been received by reason of a hole punched at G40 from the analog to digital converter 26, or from line DH2 by reason of a hole punched at G41, from line DH3 by reason of a hole punched at G42 or from DH6 by reason of a hole punched at G43, or from DH7 by reason of a hole punched at G44. A hole punched at F15 provides a signal on line 111 to place the printer in the mode to print the actual value which is being received from the system under test. The printer is placed in the TI (test identification) mode by a signal received on line 112 by means of a hole punched at F23. Such a signal requires the printer to identify the test number it is working on. A signal is received on line 113 (which is the same as line 15D from comparator 15, FIG. 5*b*) if the comparator 15 indicates that the actual value falls outside acceptable limits. When the printer has completed its print complete cycle, the output is sent out on line 114 which, by means of a hole punched at M21, may be sent to "and" gate 53*a* or by means of a hole punched at M28 allows card programmer 105 to cycle to the next card. Printer 20 provides an output signal on line 115 which controls relays K25 or K26 which allow inputs on lines DH9 or DH8 (information representing upper limit and lower limit) to be sent to the printer input.

The printer 20 is illustrated in greater schematic detail in FIGS. 11*a* through 11*h* which should be placed together reading from left to right in order to provide a more complete understanding of the printer. Looking first at FIG. 12 which illustrates a section of printing tape 116 upon which the printer prints, there are several vertical columns in which any number from 1 to 9 may be printed in any particular column. It may be arranged so that the printer prints a zero or prints nothing whenever none of the other numbers 1 to 9 are to be printed. Therefore, the digit zero and its mechanical and electrical structure may be effectively left out of the device.

Figure 11A:
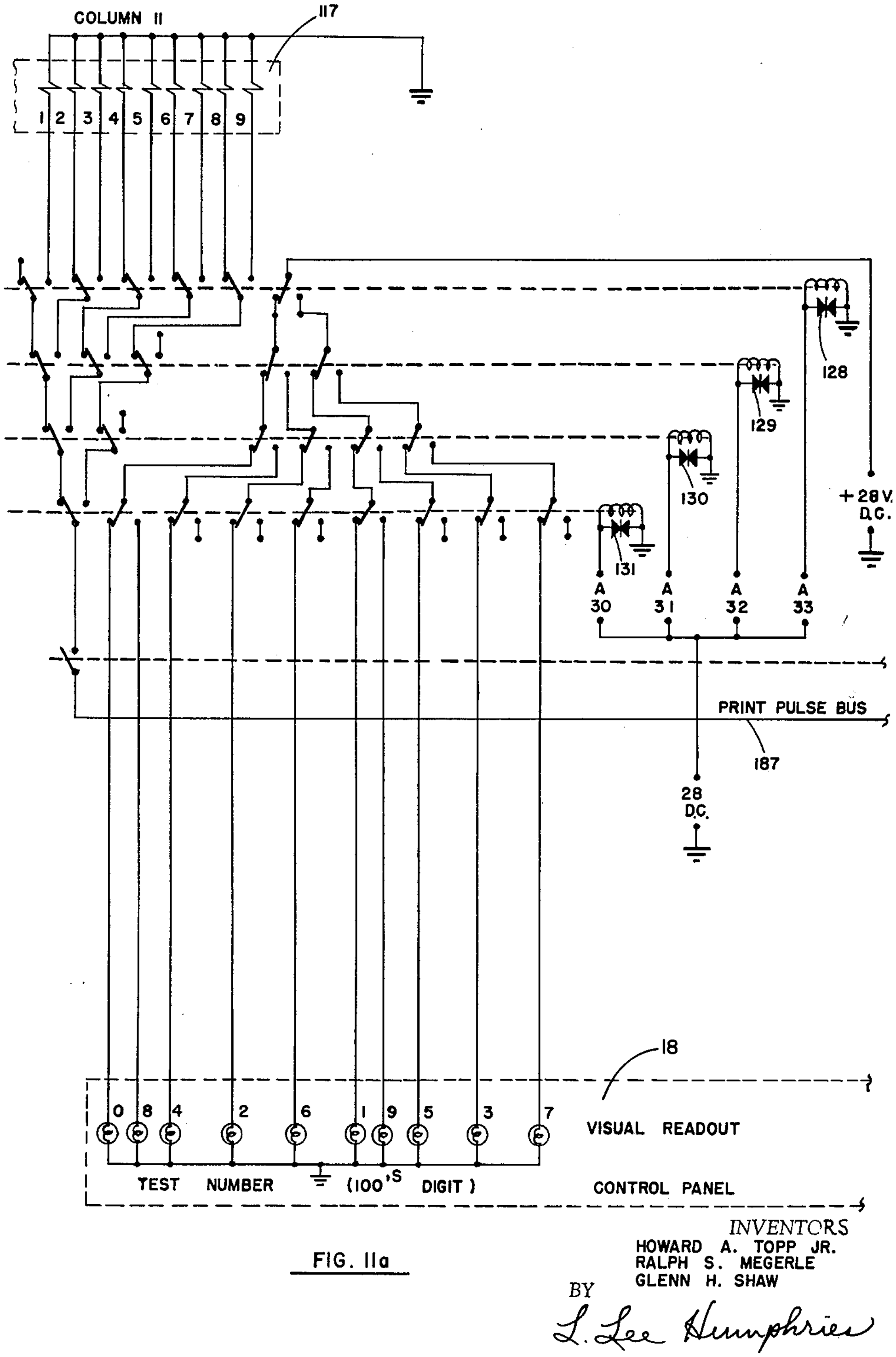

Looking first at FIG. 11*a*, at the top thereof, there is shown a group of solenoids 117 which print respective number 1 through 9 depending on which solenoid is energized. There are in FIGS. 11*b* through 11*g* additional groups of solenoids 118, 119, 120, 121, 122, 123, 124, 125, 126, and 127 which act to print in respective columns the particular characters indicated, according to the energization of specific relays.

Figure 11B:
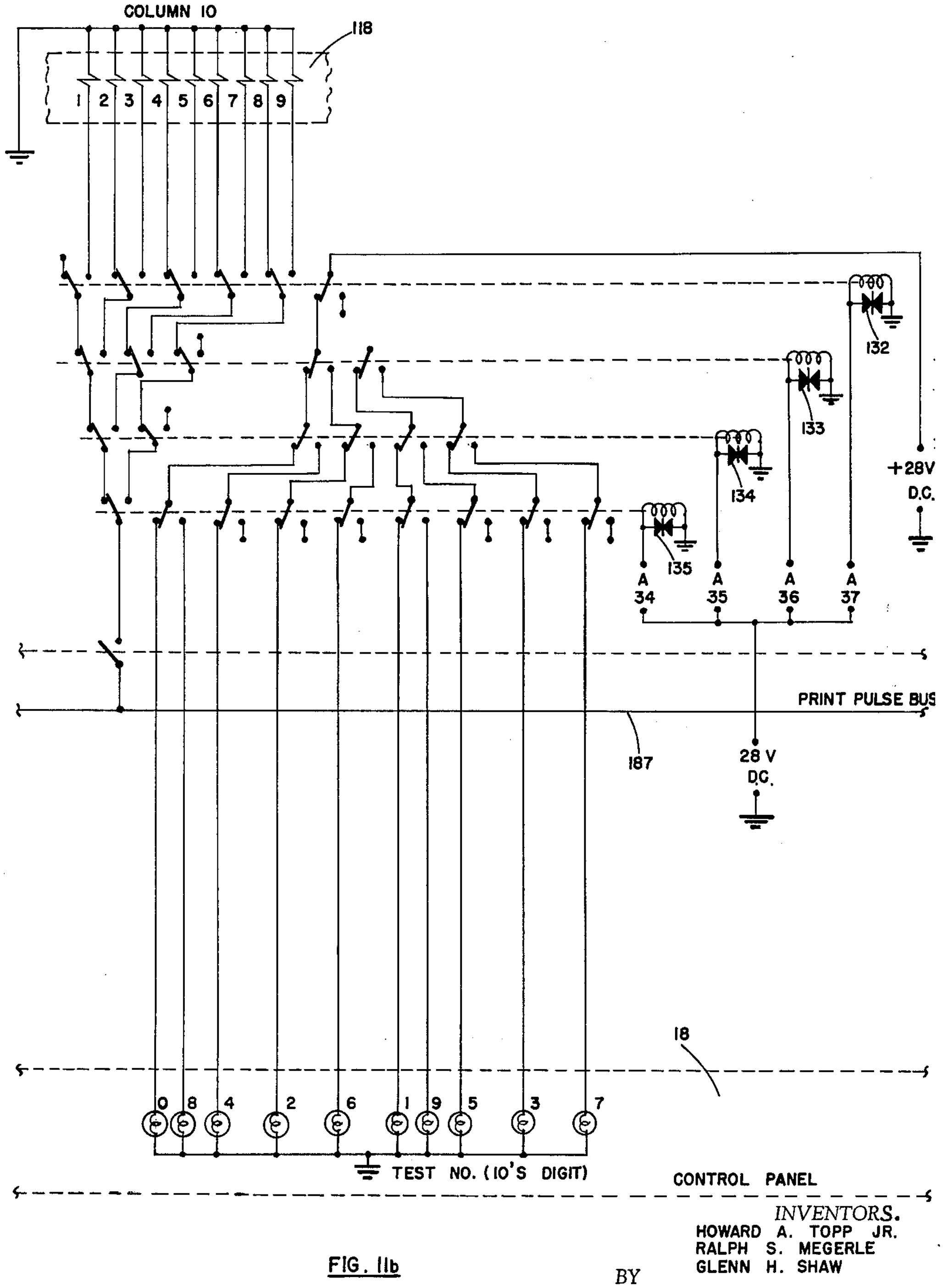
Figure 11C:
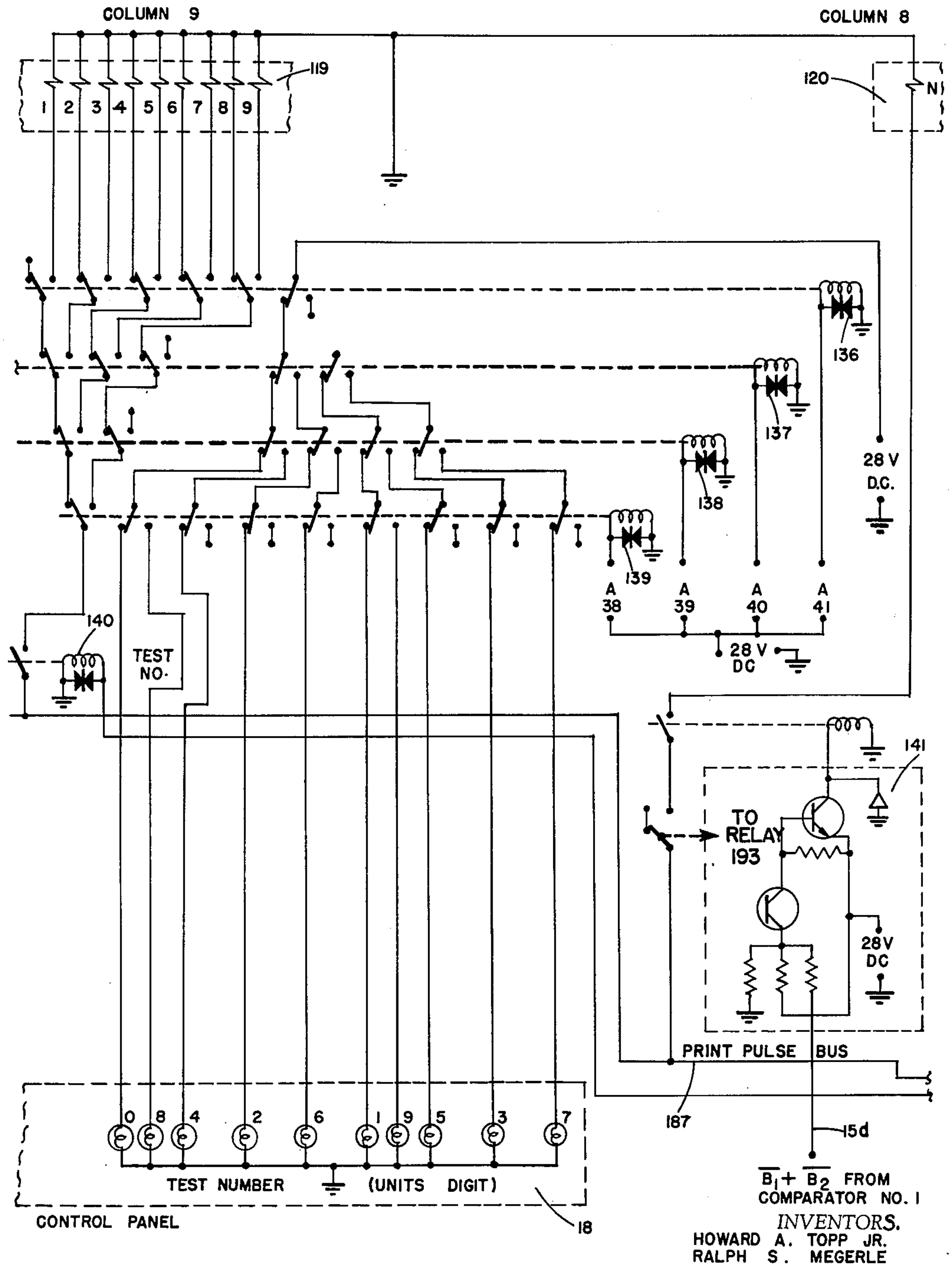
Figure 11D:
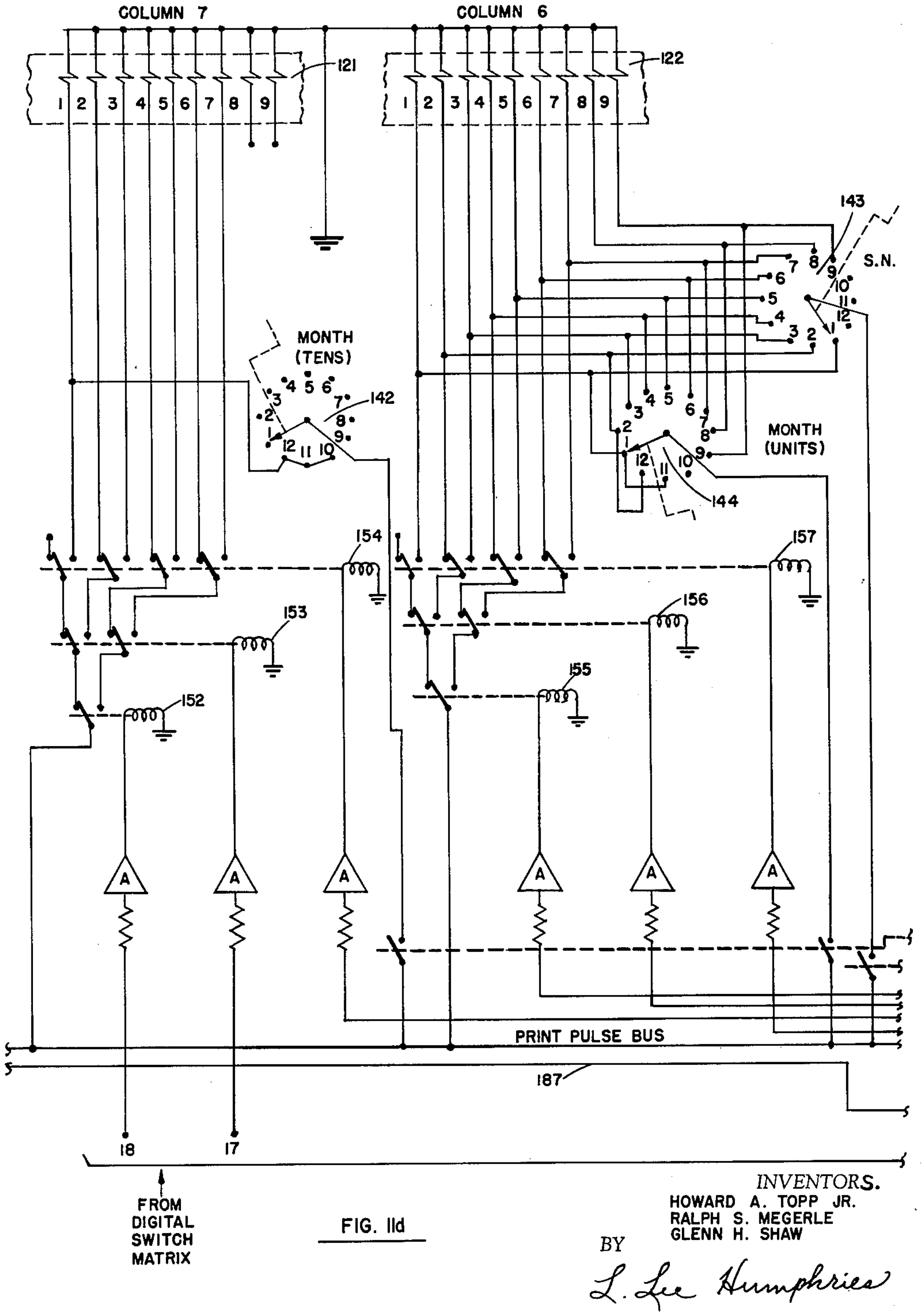
Figure 11E:
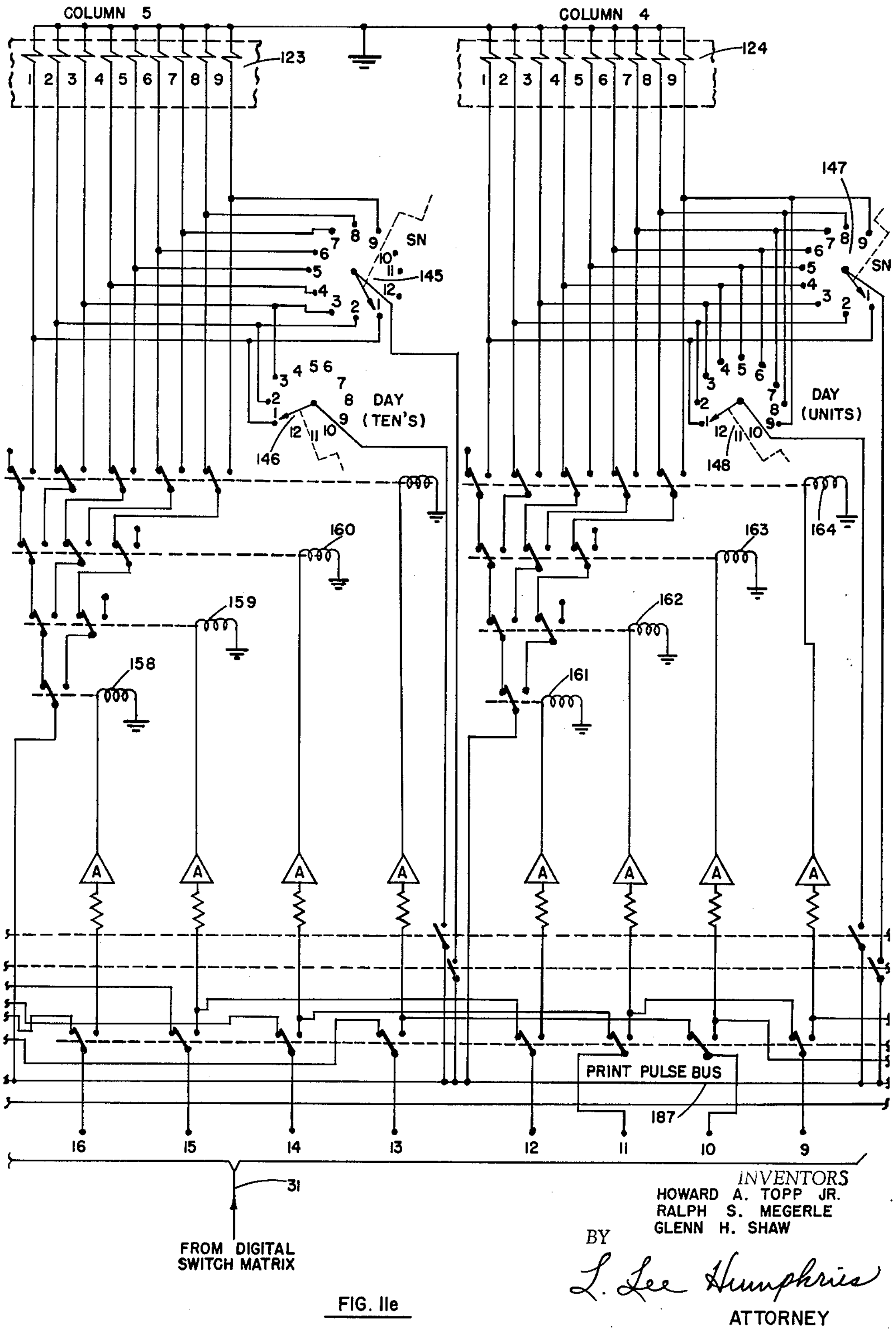
Figure 11F:
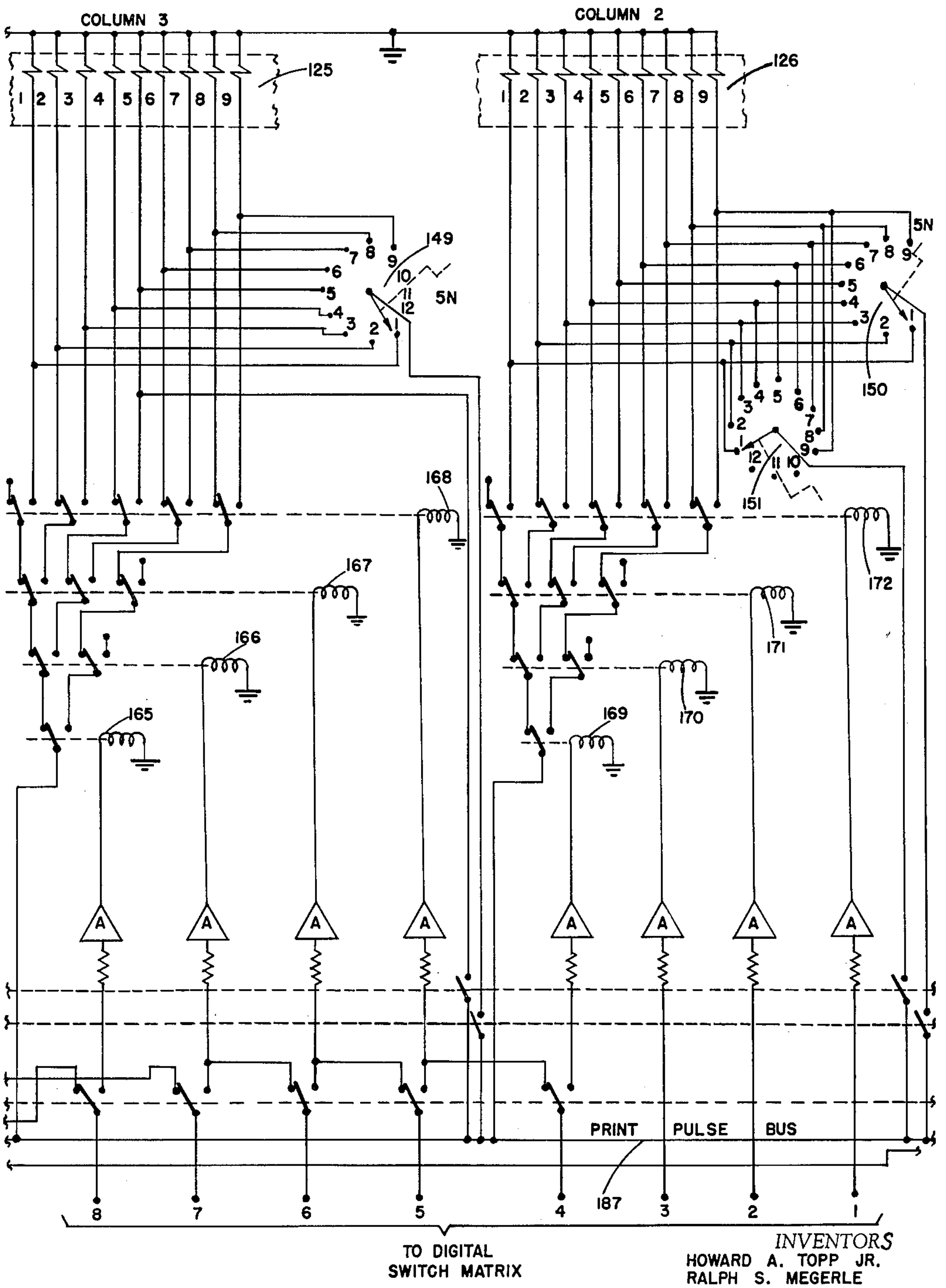
Figure 11G:
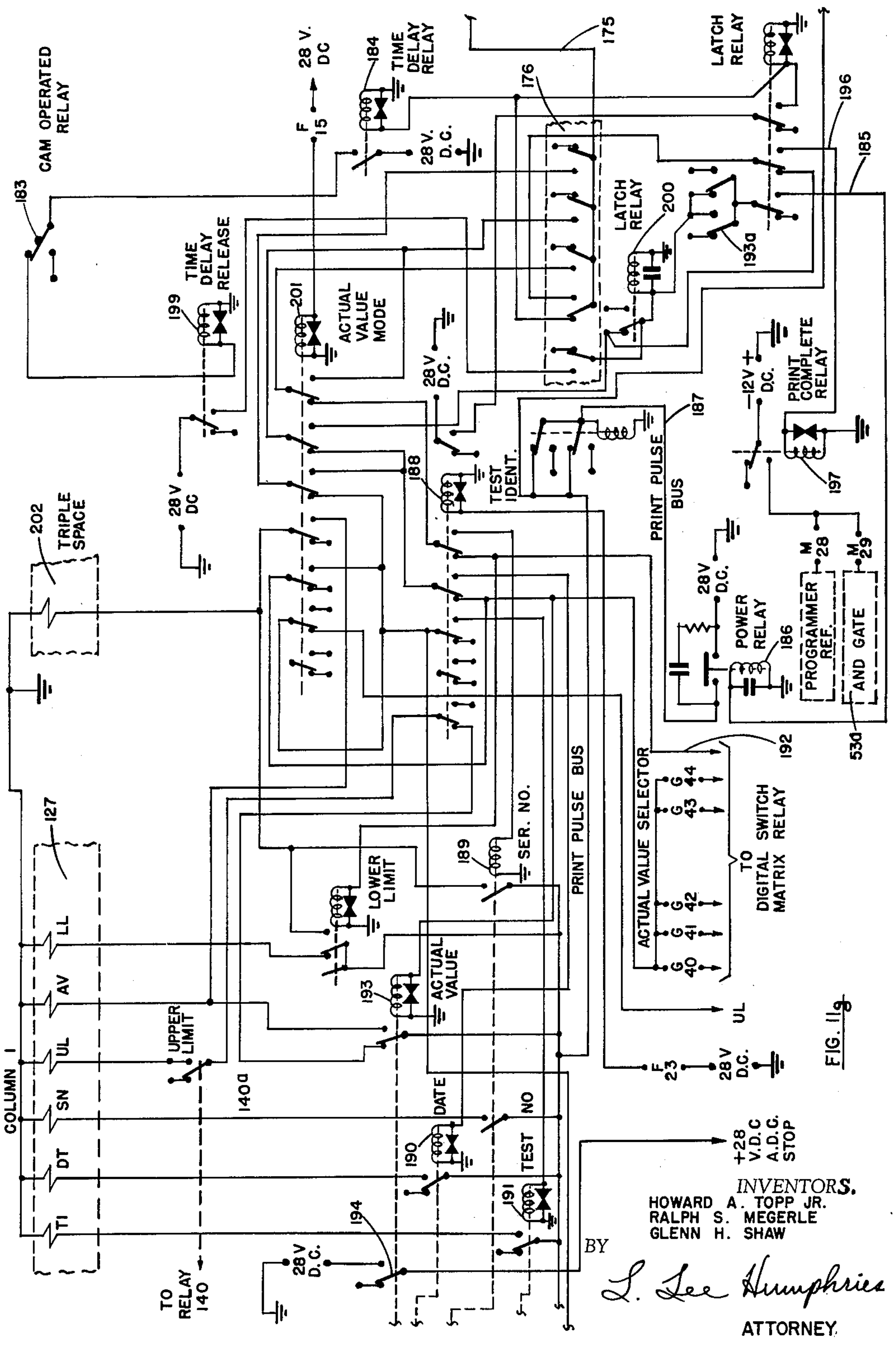
Figure 11H:
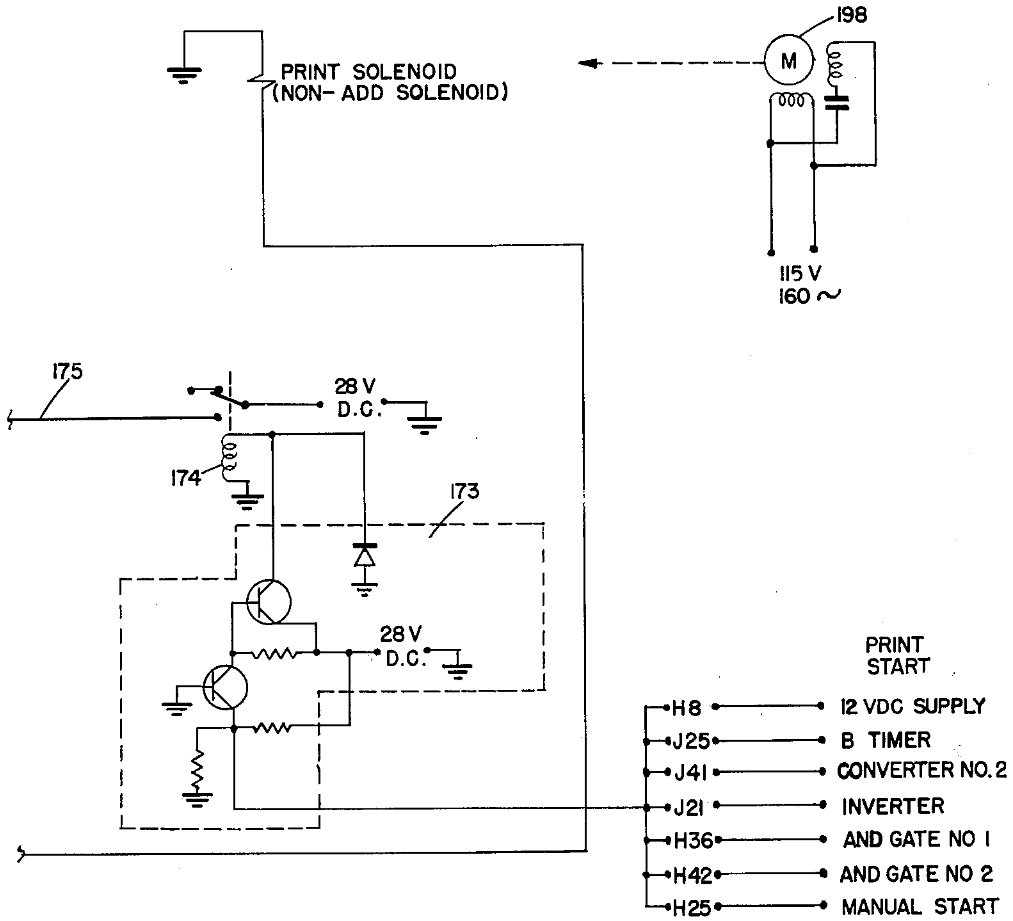

In FIG. 11*g*, box 127 represents nine solenoids which act to print letters instead of numbers as does the solenoid 120 in FIG. 11*c*. It is to be understood, of course, that these solenoids actuate, for example, the electric typewriter mechanism to allow an arm to swing, for example, and place a particular letter upon tape 116 of FIG. 12. Such structure and concept is readily known as, for example, in an electric typewriter, or conventional electric printer. Motor 198, FIG. 11*h* provides motive power for such printing.

Referring again to the tape 116 of FIG. 12, a convention is chosen in which columns 9, 10 and 11 indicate the test number to be performed. Such test number is indicated in decimal data form.

Column 8 on the tape (in which the letter "N" is shown) is utilized for indicating that the comparator indicates a "no-go" situation, that is a situation in which the actual value upon being compared with an upper limit or lower limit falls outside thereof. Columns 1 through 7 are used for various other purposes such as identifying the test mode, shown to be 9999, and identified by the reference letters TI and also by identifying the date, shown to be 12/31/57, and identified by the letters DT, or by identifying the serial number shown to be 99,999, identified by the reference letters SN. Also shown on the tape in columns 1 through 7, in the test mode may be printed the upper limit. In the device of the invention, such test data is printed in octal data form, that is, numbers are utilized 0 through 7 and no higher in each digit location. For example, on the tape is shown in octal form the number 777777, identified as being the upper limit by the letters UL. The actual value tested is shown to be represented by the octal number 777777, and is identified by the reference letters AV. The lower limit is indicated in octal form and is shown as being 777777, and is identified as being the lower limit between reference characters LL. It may be seen that the actual value falls within the upper limit and the lower limit. It is also to be noted in this instance that no tolerance is allowed because the upper limit and the lower limit are identical, and therefore an actual value, to be acceptable, must fall on a precise number. A triple space is shown on the tape and structure is shown in FIG. 11*g* for accomplishing such triple space. However, it generally is desired to be able to print the actual value in decimal data form, and such may be obtained by the device of the invention and such form is also illustrated on the tape of FIG. 12 at the bottom thereof. The number then chosen is merely chosen for explanation.

Octal data form is obtained from binary digital data in a manner well-known in the art. Taking for example, the binary digital number 01010100, which consists of eight digits, the digits are marked off from right to left in group of 3's. Therefore, the numbers 100 appear in the extreme right group. Reading from right to left, a respective value is assigned the respective digits, one to the first digit, two to the second digit, and four to the third digit providing a one appears in each digit location. The binary number 100 therefore represents an octal number 4. Turning to the next group of number 010, again respective values reading from right to left of one, two, and four are assigned and the octal number is determined to be 2. The last two digits 01 become the octal number 1. Therefore, the octal number 124 represents the binary digital number 01010100 which may be readily recognized after it is separated thusly 01 010 100.

Looking again at FIG. 11*a*, the group of solenoids 117 are capable of printing any one of the numbers 1 to 9, according to the actuation of relays 128, 129, 130 and 131 according to the card holes punched in locations A33, A32, A31 and A30, respectively. A second group of relay contacts is also provided to energize a series of lamps on the control panel 18 in order that visual inspection, in addition to printed numbers may be used to visually check the operation. In FIG. 11*b*, again, relays 132, 133, 134 and 135 are actuated according to card holes punched at card hole locations A37, A36, A35 and A34.

In FIG. 11*c*, relays 136, 137, 138 and 139 control the numbers printed according to card holes punched at card hole locations A41, A40, A39, A38. Relay 140 when energized allows printing to occur in columns 9, 10, and 11, indicating the test numbers, or, the card serial number. At 141 is illustrated a transistor amplifier of a structure used at several positions within the printer circuit which receives an input signal from comparator 15 (FIGS. 5*b* and 5*c*) on line **15*d* which indicates the results of the comparison to be "no-go." In such instances, the solenoid 120 operates, in column 8** to print "N" as shown by FIG. 11*c*.

In FIGS. 11*d*, 11*e* and 11*f* are shown and manually positioned dials 142 through 151. Dial 142, FIG. 11*d* indicates the 10's digits of the months. That is, in column 7 the numeral 1 will be printed whenever the tenth, eleventh, or twelfth month is to be indicated. Switch 144 prints the units digits of the month. Switch numbers 146 and 148 of FIG. 11*e* indicate the date in tens and units, respectively. Hand positioned switches 143, 145 and 147 of FIGS. 11*d* and 11*e* cause the serial number to be printed in 3 digits. At the bottom of FIGS. 11*d*, 11*e* and 11*f* are shown several transistor amplifiers which actuate relays 152 through 172 according to the 18 bits of digital information received from the digital switch matrix **1*d* on the lines cabled together in cabled line 31** (now shown, refer to FIG. 5*c*).

Referring to FIG. 11h, there is shown the several inputs which may act to start the printer such as, for example, a hole punched at card hole location H8, J25, J41, etc. Transistor amplifier 173 amplifies the incoming signal and drives relay 174 to connect up the 28 volt D.C. source on line 175 to various cam operated switches illustrated at 176 in FIG. 11*g*. These cam operated switches are energized so as to "make" in specific time relationship as shown in FIG. 13. The drive cams, 177, 178, 179, 180 and 181 are rotated continuously by a motor 182. The switches are caused to make at the locations indicated. Cams 177 and 178 "make" every 40° commencing at zero. The switch on cam 179 makes every 40° commencing at 30°. The cam at 180 makes every 40° commencing at 20°, and the cam 181 causes a switch to make every 40° commencing at 10°. This provides for proper cycling of the printer. Cam cycling of successive operations in a printer is well-known in the art and can be arranged for cycling according to the particular printer requirement or operational requirements.

Cam 177 operates to open latch relay 200 when print is complete.

Cam 178 operates to disconnect time delay relay 184, and to connect latch relay 200.

Cam 179 operates to actuate lower limit relay, provided the print is in neither test identification mode nor actual value mode.

Cam 180 operates to actuate actual value relay 193 if neither actual value mode nor test identification mode is being used. The actual value mode is the mode in which the printer prints actual value in decimal data from as described in FIG. 12.

Cam 181 operates primarily to actuate test number relay 140 (FIG. 11*c*).

In FIG. 11*h* is shown a motor 198 which rotates continuously to provide motive power for the printing solenoids when they are actuated. The detail of such structure is known in the electric typewriter or electric printer art and will not be described in detail here.

Referring now to FIG. 11*g*, microswitch 183 is caused to open by motor 198 each print cycle after each print "start." A time delay relay 199, a short time later opens the 28 volt circuit to the latch relay 300 and to line 185 and thus releases the power relay 186 and opens the print pulse bus.

Switch **193*a* is operated by actual value relay 193; and switch 201*a* is operated by actual value mode relay 201**.

Triple space solenoid 202 it is noted is actuated whenever a serial number is printed, a lower limit or the actual value mode occurs.

On line 175 is received a 28 volt potential (providing one of the print starts hole locations is punched, as previously indicated in connection with FIG. 11*h*), which potential is sent to relay 184 and the print cycle is commenced. As the various cams of 176 rotate, the various ordinary functions of the printer occur, allowing printing in the various columns, spacing, etc. Of course, the functions within the printer must be sequenced correctly and when a signal is received on line 185, power relay 186 is energized and a print pulse appears on print pulse bus 187 which runs throughout the various other figures of the printer.

When a hole is punched at card hole location F23, test identification relay 188 is excited and serial number relay 189 is energized, date relay 190 is energized, and test number relay 191 becomes energized.

When a lower limit signal is being printed (occurring in the cycle according to the location of cam 179 as explained in FIG. 13) an output signal is provided on line 192. When an actual value (a tested value by the printer) is being printed, a hole punched at G41, G42, G43 or G33 will cause actual value of relay 193 to be energized and the letters AV will be printed in column 1 by the printer. At the same time by reason of switch 194 becoming energized, a signal may be sent to the analog to digital converter 26 of FIG. 5*a* to stop the converter momentarily while the actual value is being printed so that the analog to digital converter does not change in the middle of the print and thus cause some ambiguousness to the printer.

In printing actual value, relay 193 is energized and the actual value becomes printed in columns 1 through 7. It will be recalled that printer can print in either octal or decimal form. When printing in decimal form, it is termed "Test Identification mode" and relay 191 is energized.

In FIG. 11*g*, it may be seen that relay switch **140*a* is actuated by test member relay 140** to cause the letters "UL" (upper limit) to be printed whenever the test number relay is actuated.

In the actual value mode (relay 191 unenergized) logical arrangement must be provided to group the various bits 1 through 18 received from the digital switch matrix in groups of threes as previously described in changing digital binary to octal data form. Bits 1, 2 and 3, FIG. 11*f*, received from the digital matrix, FIG. 11, remain connected so as to energize relays 172, 171 and 170. These three relays operated in specific combinations can cause any number to be printed up to 7, which is "octal." Bit 4 is disconnected from relay 169 and now drives relay 168. Bits 5 and 6 are disconnected from relays 168 and 169 and now drive relays 167 and 166, respectively. Such connections may be understood from the drawings. "Octal" printing is occasioned by test number relay 191 of FIG. 11*g* being energized. Thus by means of the printer, the actual value data may be printed either in octal data form or decimal data form.

When print has been completed, a signal is received on line 196 and the print complete relay 197 is energized and a signal may be sent by means of a card hole punched at location M28 or M29 to a programmer which will allow continued feeding of the cards or continuation of further printing or to "and" gate **53*a***, FIG. 5*d*.

*Patch matrix*

FIG. 10 illustrates patch matrix described as **1*a* and 1*b*** in FIGS. 3 and 5*d*. Referring again to FIG. 2, it may be seen that the input selector **1*a* is utilized to provide various test inputs to a system 10 under test and the output selector 1*b* is utilized to select various outputs of the system 10** under test in order to determine what is happening within the system. These two selectors (input and output) may be readily combined as shown in FIG. 10 into a single simplified system. Referring again momentarily to FIG. 5*d*, it may be seen that there is a resistance check signal received on line 1005 by the patch matrix. A voltage check signal is received on line 1006, a system and components check on line 1007, a subsystem check on line 1008 and a cable check on line 1009. These lines 1005 through 1009 are illustrated in FIG. 10 and may be seen to operate relays 1000 through 1004, respectively. Across the top of the figure are shown 35 wires which may be used to connect to various test points of a system to be tested. The number actually used may be greater or less and FIG. 10 is only intended to be illustrative of the general handling of a large number of wires. The wires are numbered 1 through 35 and it may be seen that in order to complete the connection in each wire, a card hole location is shown to show how to obtain connection, for example, in the first five wires. Card holes are required to be punched at locations B20 through B24 in order to complete the connections. The resistance voltage check, etc., require card hole locations to be punched at F16 through F20 in which the card hole allocations are as shown by reference to FIGS. 4*a*, 4*b* and 4*c* to verify that this location is to be used to control the patch matrix.

If, for example, it is desired to make a resistance check of the system under test, a hole is punched at F16. Relay 1000 becomes energized as does relay 1001 and it will be noted then that any one of the 35 wires may be connected to provide a signal on line **49*a*. Thus any test connection may be inspected. If it is desired to make a voltage check, relay 1001 is energized by a card hole punched at location F17 and it will be noted that the first 10 connections are now connected to a 28 volt D.-C. source and may be used to turn on the power to the system under test. Any of the remaining 25 connections may be connected according to card hole punches to provide an output on line 49*a* as previously indicated. Successive relays may be used to divide the wires into groups which may be convenient for handling systems or subsystems. For example, a card hole punched at location F18 energizes relay 1002 and the wires 1 through 20 are now connected to a 28 volt D.-C. source and wires 21 through 25 are connected to receive an input on line 9. Wires 26 through 30 are connected to receive a signal on line 41*a* and wires 31 through 35 are connected to provide a signal on line 49*b*. It is noted that some groups of connections may be energized with the power source. Others may be connected to receive input signals and still others may be connected to provide output signals. Still further segregation and division of the various wire connections may be accomplished by energizing relays 1003 and 1004** by card holes being punched at locations F19 and F20. If desirable, substantially all of the wire connections may be connected with a 28 volt D.-C. source in order to determine cable continuity, by a card hole punched at location F20.

*Comparator*

FIG. 9 illustrates in schematic detail one method of mechanizing the comparator 15 of FIG. 5*b*. Understanding that the input to comparator 15 is received, for example on cabled line DV3, FIG. 5*b*, which consists of 18 separate wires, each carrying a signal representing a binary bit, these wires are connected in order, from most significant bit down, to connections 901, 902, 903 through 917 and 918, FIG. 9. These signals, it will be recalled, represent, for example, the upper limit of a voltage or value to be tested. The signal with which this upper limit is to be compared, referring momentarily to FIG. 5*b* again, is received on cabled line DV4 of comparator 15 which also is 18 wires cabled together. This value may be, in a particular example, an actual value existing in the system under test and it is desired to determine bit by bit whether the actual value (received from the system under test) is less than the upper limit. Such actual value bits are connected wire by wire reading from the most significant bit down to connections 920, 921, 922 through 936 and 937. If the actual value is above the upper limit, a signal is provided out of the comparator 15 on line **15*c***, as indicated previously in connection with FIGS. 5*a, b, c* and *d* and as shown in FIG. 9. Thus, bit by bit comparison has been obtained between an upper limit and an actual voltage and a signal provided if the actual voltage exceeds the upper limit.

It may be appreciated also that an additional comparator of the same schematic diagram may be used to compare the actual voltage with the lower limit. In this case, however, the actual voltage is connected bit by bit to connections 901, 902, 903 through 917 and 918, while the lower limit digital input is connected bit by bit to connections 920, 921, 922 through 936 and 937. If the actual voltage is below the lower limit voltage, a signal is received out upon line **15*c* (but which in this instance would be labeled 15*b*** as shown by the dotted lead line). Referring, momentarily to FIG. 9*a* which represents the output of comparator 15, there is shown the additional outputs of comparator 15 on lines **15*a* and 15*d*. If no signal is received on line 15*c* indicating that the actual value lies below the upper limit and if no signal is received on line 15*b* indicating that the actual value lies above the lower limit, no signal passes "or" gate 938 and the monostable multivibrator 939 remains in its stable condition, providing an output on line 15*a* indicating a favorable comparison, that is, the actual voltage lies within the upper and lower limits. However, if a signal is received either on line 15c or 15b, signal passes "or" gate 938 and causes the multivibrator to flip to its alternate state, and an output is provided on line 15d** indicating that the actual value tested lies outside the acceptable limits.

*Phase rotation box*

Referring momentarily to FIG. 5*a*, it may be seen that three phases, *a*, *b* and *c* may be fed to phase rotation box 1401 which will determine the existence of each of the phases and the correctness of their rotation, and provide an output signal accordingly. FIG. 14 clearly illustrates the electrical schematic of this phase rotation box and it may be seen to be comprised of various resistors and capacitors connected together to provide an output on lines 1402 and 1403 which may be sent to the analog to digital converter for inspection, to determine correct phase rotation or to determine the existence of each of the phases. Such phase signals may have originated, of course, in the system under test. Therefore, a system under test may be inspected for direct phase rotation and existence of each of the phase components.

*Timer*

FIG. 16 illustrates in block diagram form, one embodiment of the timer 30 of FIG. 3. An A.-C. source 54 provides signals to a counter 55 in serial input form, the output of the counter is read in digital form in parallel by a timer comparator 30a. The timer comparator structure is, of course, well-known in the art and compares two binary digital inputs, one received from the counter and the other received from the various lines comprising cable 29, providing a hole is punched at card location G36. When the bits of information received by the timer comparator on cable 29 match the count in counter 55, an output pulse is provided on line 30. In this manner, source 54 can be scaled according to a digital input signal on cable 29 to provide a desired frequency out on line 30b. Such structure of course may be similar to the structure of comparator FIG. 9 wherein bit by bit comparison takes place and an output signal provided when one group of bits exceed another group with which it is being compared. When a signal is provided out on line 30b, reset pulse is sent back to the counter on line 30c to reset the counter to zero. The counter 30c then commences counting up again until it matches the signal received by timer comparator 30a on line 29 out in the signal provided out on line 30b.

*Converters*

FIGS. 17 and 18 illustrate converters which may be seen to be relatively simple transistor circuits for changing voltage levels from 28 volts D.-C. to −12 volts D.-C. and −12 volts D.-C. to 28 volts D.-C., respectively.

*Inverters*

FIG. 19 is a schematic diagram of an inverter 104 showing an input representing the proposition B and it is inverted to provide an output representing a proposition $\overline{B}$ (not B). When the input is zero volts, the output is −12 volts and when the input is −12 volts, the output is zero volts.

*Low frequency amplitude and phase measure*

In FIG. 5*c* is shown low frequency oscillator 99 which is connected to be reset by an incoming signal on line 99a, to be placed in mode 1 (so as to provide an output on line 99b or mode 2 so as to provide an output 2 on 99c, which may be accomplished by relatively simple relay control). Oscillator 99 of course provides a suppressed carrier signal on line 99d and, in addition, a signal modulated carrier on line 99e. It is believed that the structure of such an oscillator is well-known in the art and the details need not be shown here. Low frequency amplitude and phase measuring device 197 may be set to a desired phase range by a signal on line 197a. It may be set to indicate amplitude or phase measurement by a signal on line 197b, or may be placed in amplitude range 1 or 2 by a signal on lines 197c and 197d, respectively. The low frequency input signal is received on line 197e. Any device of course, may be used which will indicate peak amplitude, effective or average values (depending on what quantity is desired). Also anyone of phase indication means, phase meters or such may be used to measure phase. Such device, together with low frequency oscillator 99 provides means for analyzing the performance of servo systems. To apply the suppressed carrier signal to a servo system, a hole is punched at card location L25 and the signal is sent as an input to A.-C. digital to analog converter 5A4 and is then provided as an output from converter 5A4 through a hole punched at card location L44 to be applied to the system under test. The digital to analog converter 5A4, of course, may be used to scale the signal received from low frequency oscillator 99. The response of the device under test (such as a servo) may be determined by connecting to receive the output of the servo on one of the lines forming cable 49 and transmitting the information to analog to digital converter 26 (as for example by a hole punched at location H14), and further transmitting the information to comparator 15 as an actual value to be compared with a programmer upper limit or lower limit which may be utilized in the comparator.

It may be readily understood in view of the foregoing explanation that a highly flexible automatic checkout device is thus obtained by reason of the digital switch matrix, maximum usage is obtained of digital devices such as the analog to digital converter, the count registers, and the memory storage devices, which in this case are illustrated as being punched cards. However, it may be readily recognized that such memory storage device may be any of those which are well-known and recognized, as, for example, punched tape, magnetic recording, magnetic cores, and other methods of recording or storing information. By reason of the internal switching matrix, maximum usage is made of the various analog devices such as the digital to analog converters, and the other function generators. A maximum of test information is available by reason of the patch matrix. Further, by reason of the patch matrix, flexibility is achieved which allows selection of a great many input or output leads to the system to be tested (and from the patch matrix) back into the switching matrix. A further flexibility is achieved, which allows routing of the output information to anyone of a number of devices comprising the system.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In automatic functional test equipment, a programmer comprising storage means having information stored therein, said information comprising information as to the electrical test signals to be applied, the selection of input leads to an object under test, the selection of output leads from an object under test, and reference digital signals indicating acceptability or non-acceptability of the response of the object under test, means for generating an electrical test signal under the control of said stored information as to electrical test signals to be applied to said object under test, connection means for applying said generated electrical test signal to said object under test under the control of said input lead information stored in said storage means, connection means for selecting particular output leads of the object under test under the control of said output lead selection information stored in said storage means, an analog to digital converter, and a digital comparator connected to receive the output of said analog to digital converter and said reference digital signals indicating acceptability or non-acceptability of response of the object under test, for comparison purposes.

2. In combination, resistance checking means in an automatic checkout device, said means comprising a programmer means providing a first reference value representing a signal to be applied to a system under test and a second reference value representing a limit of acceptability of a system under test, means for providing in response to said first and second reference values, electrical signals to a system to be tested, said programmer further comprising means providing electrical signals controlling the application of said first reference value electrical signals to said system under test, analog to digital converter means connected to receive selected voltage of said system under the application of said signal represented by said first reference value, and comparison means for comparing the output of said analog to digital converter with said signals represented by said second reference value.

3. In combination means for storing information in digital form, a first switch matrix responsively connected to be controlled by said information stored in digital form and connected to receive at its inputs for switching purposes said information stored in digital form, an analog to digital converter having outputs connected to the inputs of said first switch matrix, a digital comparator having inputs connected to the outputs of said first switch matrix, at least one digital to analog converter having inputs connected to the outputs of said first switch matrix, a second switch matrix having inputs connected to the outputs of said digital comparator and said digital to analog converter and having outputs connected to the inputs of said analog to digital converter.

4. The combination recited in claim 3 wherein is included output connections from said second switch matrix to a system to be tested, and input connections to said second switch matrix from a system to be tested, whereby electrical signals may be applied to said output connections and received from said input connections.

5. In combination, means for shoring information in digital form, a first switch matrix responsively connected to be controlled by said information stored in digital form and having inputs connected to receive for switching purposes said information stored in digital form, an analog to digital converter having outputs connected to the inputs of said first switch matrix, a digital comparator having inputs connected to the outputs of said first switch matrix, a plurality of digital to analog converters each having inputs connected to receive the outputs of said first switch matrix, a second switch matrix having inputs connected to the outputs of said digtial comparator and said digital to analog converter and having outputs connected to the inputs of said analog to digital converter, wherein is included output connections from said second switch matrix to a system to be tested, input connections to said second switch matrix from a system to be tested, and wherein is further included a third switch matrix for controlling the input and output connections to a system to be tested.

6. In combination, means for storing information in digital form, a first switch matrix responsively connected to be controlled by said information stored in digital form and having inputs connected to receive information, said information stored in digital form, an analog to digital converter having outputs connected to the inputs of said first switch matrix, a digital comparator, at least one digital to analog converter having inputs connected to the outputs of said first switch matrix, a printer responsively connected to the outputs of said first switch matrix, second switch matrix having inputs connected to the outputs of said digital comparator and said digital to analog converter, a plurality of sources of electrical voltages connected to the inputs of said second switch matrix, at least one voltage level converter having inputs connected to the outputs of said second switch matrix and having outputs connected to the inputs of said second switch matrix, said analog to digital converter having inputs connected to the outputs of said second switch matrix.

7. The combination recited in claim 6 wherein is further included a third switch matrix comprising a plurality of electrical connectors to be connected to a system under test, a plurality of switches in said connectors and means for connecting said connectors together in groups, said switches and said means for connecting in groups being responsive to said stored digital information.

8. In combination, means for providing information in digital form comprising an analog to digital converter, at least one counter, and information storage means, said combination further comprising a first switch matrix having inputs connected to receive information in said means providing information in digital form, said first switch matrix connected to be controlled by information in said means providing information in digital form a comparator having inputs connected to the outputs from said first switch matrix, a plurality of function generators having inputs connected to the outputs from said first switch matrix, a second switch matrix having inputs connected to the outputs from said comparator and said function generators, and connected to provide outputs to the inputs of said analog to digital converter and said counter, a third switch matrix having inputs connected to receive the outputs of said second switch matrix and having outputs connected to the inputs of said second switch matrix.

9. The combination recited in claim 8 wherein a printer is connected to receive through said first switch matrix the output of said analog to digital converter and the output of said information storage means.

10. In combination, a digital switch matrix, first and second analog switch matrices, said second analog switch matrix comprising a plurality of connections for a system to be tested, a plurality of function generators connected to said first analog switch matrix, said first analog switch matrix connected to said second analog switch matrix, said second analog switch matrix connected to said first analog switch matrix, and an analog to digital converter having inputs connected to outputs from said first analog switch matrix, and having outputs connected to said digital switch matrix.

11. The combination recited in claim 10 wherein is included digital comparison means having inputs connected to the outputs of said digital switch matrix and outputs indicating results of a comparison of signals at said inputs.

12. In automatic functionual test equipment having a register, function generator, timer, comparator, analog-to-digital converter and recording means, a programmer comprising, a test record and static means for reading therefrom test information for selection of input and output test points of an object under test, test signals to be applied to said input test points, reference signals for comparison with response signals at said output points, and a programmed delay, a first switch matrix controlled by said static reading means for selectively storing in digital form said reference signals in said register, directing said test signals to be transmitted by said function generator, transmitting said programmed delay to said timer, coupling the stored reference signals from said register to said comparator, and coupling said analog-to-digital converter to said comparator, a second switch matrix controlled by said static reading means for selectively coupling said test signals to said input test points, and for coupling said output test points to said analog-to-digital converter, gate means connected to said timer for transmitting a timing signal to said register to cause said stored reference signals to be transmitted to said comparator through said first switch matrix, and a third switch matrix for selectively coupling said gate means to said recording means for controlling the time of recording output signals from said comparator.

13. In automatic functional test equipment, the combination as defined in claim 12 including a visual indicator selectively coupled to said comparator under the control of said static reading means.

14. In automatic functional test equipment, the combination as defined in claim 12 wherein said third switch matrix selects one of several scales of said analog-to-digital converter under the control of said static reading means.

15. In automatic functional test equipment having an analog-to-digital converter and a comparator, a programmer comprising, a test record and static means for reading therefrom test information for selection of input and output test points of an object under test, test signals to be applied to said input test points, and electrical signals representing upper and lower limits of an acceptacle test value to be derived from said output test points, a function generator for transmitting said test signals, a first switch matrix controlled by said static reading means for selectively storing said electrical signals representing upper and lower limits in said comparator, directing said test signals to be transmitted by said function generator, and coupling said analog-to-digital converter to said comparator for comparison of an electrical signal therefrom with said electrical signals representing upper and lower limits, and a second switch matrix controlled by said static reading means for selectively coupling said test signals to said input test points, and for coupling said output test points to said analog-to-digital converter.

16. In automatic functional test equipment, the combination as defined by claim 15 including a recorder wherein said first switch matrix selectively transfers to said recorder said electrical signals representing upper and lower limits, and actual test values derived from said ouput test points, under the control of said reading means.

17. In automatic functional test equipment, the combination as defined by claim 15 including a timer wherein said first switch matrix transmits a specified programmed delay to said timer under the control of test information specifiying a programmed delay read by said static means, and gate means connected to said timer for timing the coupling of said output test points to said analog-to-digital converter.

18. In automatic functional test equipment wherein said analog-to-digital converter is provided with several scales of conversion, the combination as defined in claim 15 including means for selecting under control of said test information read by said static means one of said scales of said analog-to-digital converter.

References Cited by the Examiner

UNITED STATES PATENTS

| | | | |
|---|---|---|---|
| 2,328,750 | 9/1943 | Smith et al. | 324—73 |
| 2,329,491 | 9/1943 | Sulzer | 324—73 |
| 2,348,680 | 5/1944 | Hanson et al. | 340—147 |
| 2,483,281 | 9/1949 | Herr | 340—147 |
| 2,700,756 | 1/1955 | Estrems. | |
| 2,731,621 | 1/1956 | Sontheimer | 340—149 |
| 2,776,405 | 1/1957 | Moore et al. | 324—73 |
| 2,785,388 | 3/1957 | McWhirter et al. | 340—149 |
| 2,798,199 | 7/1957 | Potter | 324—62 |
| 2,892,153 | 6/1959 | Neill | 324—73 |
| 2,922,950 | 1/1960 | Douglass et al. | |
| 2,950,437 | 8/1960 | Stahl | 324—73 |
| 2,963,652 | 12/1960 | Taylor et al. | 324—158 |
| 2,967,997 | 1/1961 | McCoy | 324—73 |
| 2,977,535 | 3/1961 | O'Connor et al. | 324—73 |

FOREIGN PATENTS

| | | |
|---|---|---|
| 167,947 | 7/1956 | Australia. |
| 214,213 | 3/1958 | Australia. |
| 798,571 | 7/1958 | Great Britain. |

OTHER REFERENCES

"Automatic Functions Tester," Electronic Design, June 15, 1956, pgs. 46–47.

"Go-No-Go Gage Checks Out BOMARC Automatically," Electronics, Engineering Edition, July 4, 1958, pgs. 43–45.

"Robot Circuit Tester," Radio Electronics, July 1956, pgs. 55–57.

WALTER L. CARLSON, *Primary Examiner.*

EVERETT R. REYNOLDS, SAMUEL BERNSTEIN, *Examiners.*